United States Patent [19]

Konno

[11] Patent Number: 5,732,259

[45] Date of Patent: Mar. 24, 1998

[54] INFORMATION CLASSIFYING SYSTEM THAT DISCOVERS THE HIERARCHICAL STRUCTURE OF KEYWORDS BY COMPARING LINK NUMBERS

[76] Inventor: Atsushi Konno, 4-17-18 Teraonaka, Ayase-City, Kanagawa, Japan

[21] Appl. No.: 393,405

[22] Filed: Feb. 23, 1995

[51] Int. Cl.[6] .................................................. G06F 17/30
[52] U.S. Cl. .................... 395/605; 395/611; 395/602; 395/601; 364/283.1
[58] Field of Search .................... 345/600; 395/600, 395/603, 604, 605, 601, 602; 364/283.1, 968

[56] References Cited

U.S. PATENT DOCUMENTS

| | | | |
|---|---|---|---|
| 3,670,310 | 6/1972 | Bharwani et al. | 395/603 |
| 5,140,692 | 8/1992 | Morita | 395/605 |
| 5,168,565 | 12/1992 | Morita | 395/603 |
| 5,297,042 | 3/1994 | Morita | 395/605 |
| 5,418,948 | 5/1995 | Turtle | 395/604 |
| 5,428,778 | 6/1995 | Brookes | 395/605 |
| 5,463,773 | 10/1995 | Sakakibara et al. | 395/613 |
| 5,488,725 | 1/1996 | Turtle et al. | 395/605 |

*Primary Examiner*—Thomas G. Black
*Assistant Examiner*—Greta L. Robinson

[57] ABSTRACT

A system classifies the information added with keywords by discovering the hierarchy relation with respect to all of keywords. There is generated a relation composed of a total link number and links to other keywords and information, each for keyword. The total link numbers of two relations with links are compared with each other thereby determining a high level relation having a larger total link number and a low level relation having a lower total link number, and a hierarchy structure can be discovered by making the link from the low level relation to the high level relation ineffective.

3 Claims, 40 Drawing Sheets

| | | | | | |
|---|---|---|---|---|---|
| A | 2 | B | 2 | C | 2 |
| AE | 3 | BF | 7 | CG | 4 |
| AEI | 5 | BFK | 2 | CH | 2 |
| AEIM | 1 | BFL | 4 | | |
| AEIN | 2 | BFLP | 5 | | |
| AEJ | 4 | | | | |
| AEJN | 5 | | | D | 3 |
| AEJO | 6 | | | | |
| AEK | 2 | | | | |

FIG.12

| | |
|---|---|
| A | 30 |
| B | 20 |
| C | 8 |
| D | 3 |
| E | 28 |
| F | 18 |
| G | 4 |
| H | 2 |
| I | 8 |
| J | 15 |
| K | 4 |
| L | 9 |
| M | 1 |
| N | 7 |
| O | 6 |
| P | 5 |

FIG. 13

| A | E | B | F | J | L | C | I | N | O | P | G | K | D | H | M |
|---|---|---|---|---|---|---|---|---|---|---|---|---|---|---|---|
| E | A | F | B | A | B | G | A | A | A | B | C | A | A | C | A |
| H | I | K | K | E | F | H | E | E | F | F | — | E | E | — | E |
| I | J | L | L | N | P | — | M | I | J | L | — | B | — | — | I |
| J | K | P | P | O | — | — | N | J | — | — | — | F | — | — | — |
| K | M | — | — | — | — | — | — | — | — | — | — | — | — | — | — |
| M | N | — | — | — | — | — | — | — | — | — | — | — | — | — | — |
| N | O | — | — | — | — | — | — | — | — | — | — | — | — | — | — |
| O | — | — | — | — | — | — | — | — | — | — | — | — | — | — | — |

ALTERATION

| PARTICLE IDENTIFIER | 2 |
| --- | --- |
| KEYWORD IDENTIFIER | 1 |
| KEYWORD IDENTIFIER | 2 |
| KEYWORD IDENTIFIER | 4 |

BEFORE | AFTER

RELATION 1
```
C---1
L---C2---1
L---C3---1
L---P1
```

RELATION 1
```
C---1
L---C2---2
L---C3---1
L---C4---1
L---P1
L---P2
```

RELATION 2
```
C---2
L---C1---1
L---C3---1
L---P1
```

RELATION 2
```
C---2
L---C1---2
L---C3---1
L---C4---1
L---P1
L---P2
```

RELATION 3
```
C---3
L---C1---1
L---C2---1
L---P1
```

RELATION 3
```
C---3
L---C1---1
L---C2---1
L---P1
```

RELATION 4
```
C---4
L---C1---1
L---C2---1
L---P2
```

5,732,259

INFORMATION CLASSIFYING SYSTEM THAT DISCOVERS THE HIERARCHICAL STRUCTURE OF KEYWORDS BY COMPARING LINK NUMBERS

BACKGROUND OF THE INVENTION

Information systems such as document-retrieval systems handle information using keywords. Keywords help users to retrieve information.

However, existing information systems handling extensive information have a problem:

with many keywords available, which is the appropriate keyword to retrieve a given information?

The answer is to classify the information hierarchically. However, this leads to another problem, i.e., When is the hierarchical structure decided? If the hierarchical structure is decided before information is entered, it may differ from the actual structure of the data. If not, how is the hierarchical structure decided?

This invention resolves these problems.

SUMMARY OF THE INVENTION

This invention classifies information by discovering the hierarchical structure of all keywords added to the information.

This invention creates relations from the keywords and discovers the hierarchical structure using the relations.

A relation contains an identifier, links and a total link number. Each identifier identifies a keyword; each link links to other relations or information.

The hierarchical structure of keywords is discovered as follows:

relations having a larger total link number are selected as the higher-ranking relation; and links to higher-ranking relation are made ineffective.

BRIEF DESCRIPTION OF THE DRAWINGS

FIG. 12 is the numbers of times that keywords appear.

FIGS. 13, 14, 15, 16, 17, 18, 19, 20, 21, 22, 23, 24, 25, 26, 27, 28, 29, 30 and 31 show the process used to discover the hierarchical structure of keywords.

DETAILED DESCRIPTION OF THE INVENTION

First, I will explain the idea of this invention.

In an information system that handles numerous information, keywords are added to the information.

If the keywords are combined correctly, keywords for higher-ranking concepts will be more frequently used.

For example, information on "money supply" is classified by the keywords "economics" and "social science". "Social science" is a higher-rank keyword than "economics". This is because concept of social science includes economics, politics and sociology. "Social science" is always used as keyword whenever the lower-ranked keywords "economics", "sociology" and "politics" are used. "Social science" is a more frequently used keyword than "economics", "politics" or "sociology"; more frequently used keywords are of higher rank.

The hierarchical classification process is shown in FIGS. 10 to 31.

Figures 10, 11:
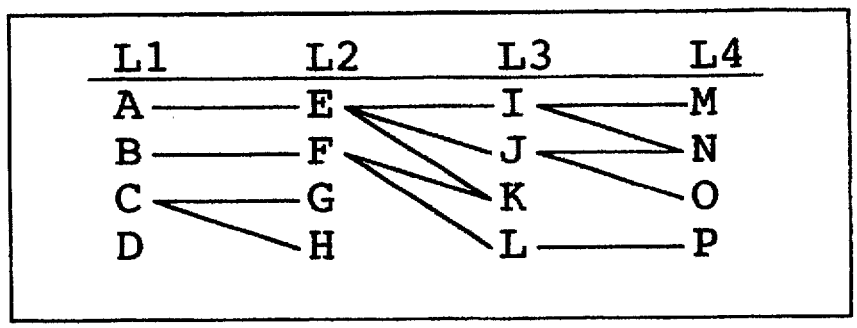
FIG. 10 is a hierarchical structure.
FIG. 11 is the numbers of combinations of keyword.

FIG. 11 shows the numbers of combinations of keywords.

The letter A,B,C . . . P refer to keywords. Of these, the combination of A and E is used 3 times, and the combination of A,E and J is 4 times.

FIG. 12 shows the numbers of times that keywords appear. This number is equal to the total link number of relation.

FIG. 13 shows a sorted list of relations. The vertical character string shows relations; AEIJKMNO refers to the relation for keyword A , known as relation A which has links to relations E,I,J,K,M,N and O.

Figure 14:
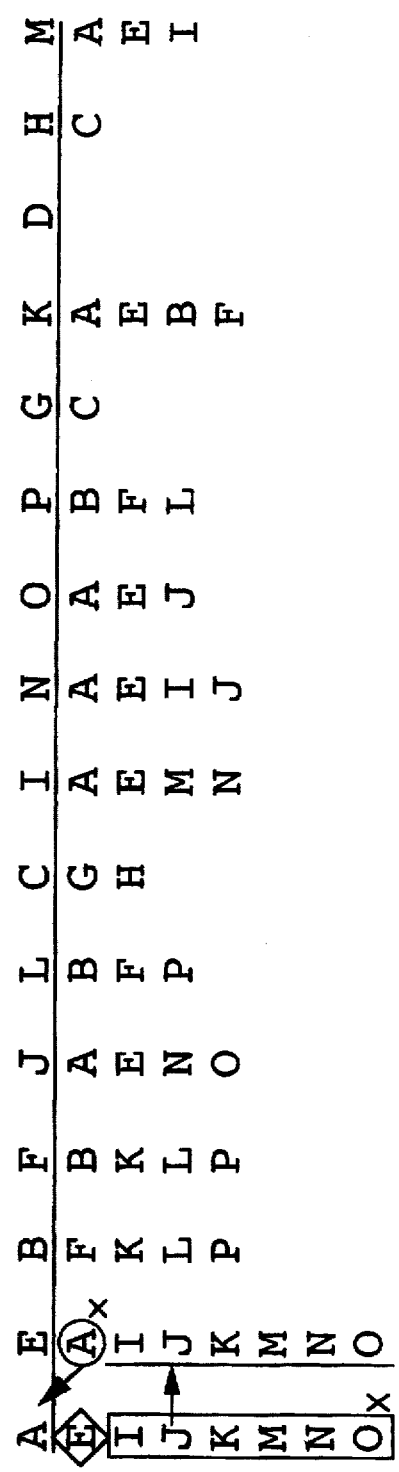

First, the E of relation A is focused, the rhombus in FIG. 14 as a focal point. This E is the link that links to relation E, which is the vertical character string EAIJKMNO.

Relation A has a higher rank than relation E because relation A has larger total link number than relation E. Relation E's A, which links to relation A, is an ineffective link because part of relation A is focused. The cross in FIGS. 14 to 31 signifies the ineffective condition. The I,J,K,M,N and O of relation A are also ineffective links, because they are included in relation E, which is of lower rank than relation A.

Figure 15:
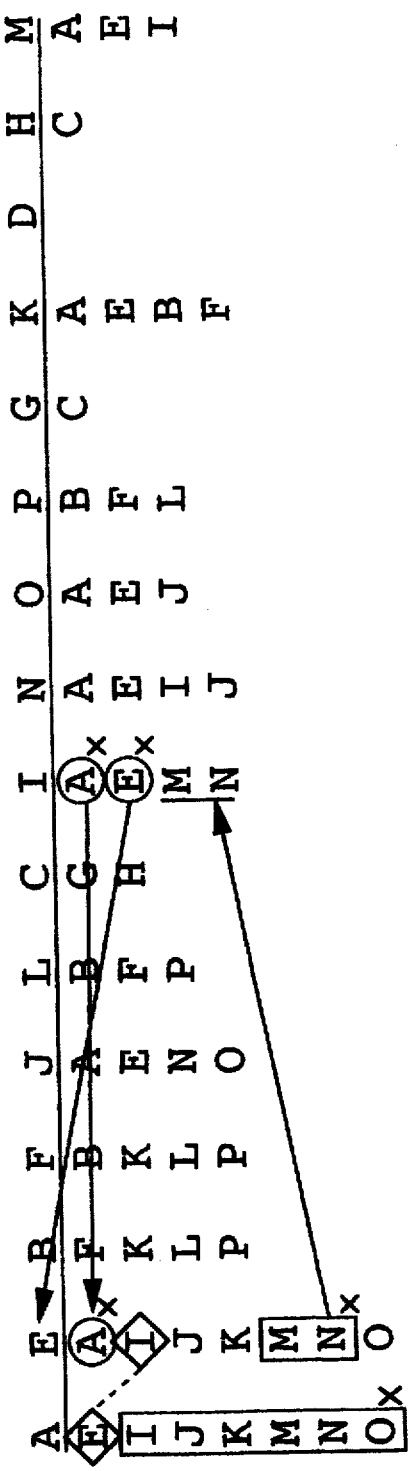

Next, in FIG. 15, relation E's I, which links to relation I, is focused. Relation I is 8th vertical character string from left.

Link A and E of relation I are ineffective, because parts of relation A and relation E are focused. Link M and link N of relation E are also ineffective, because they are included in relation I which is of lower rank than relation E.

Figure 16:
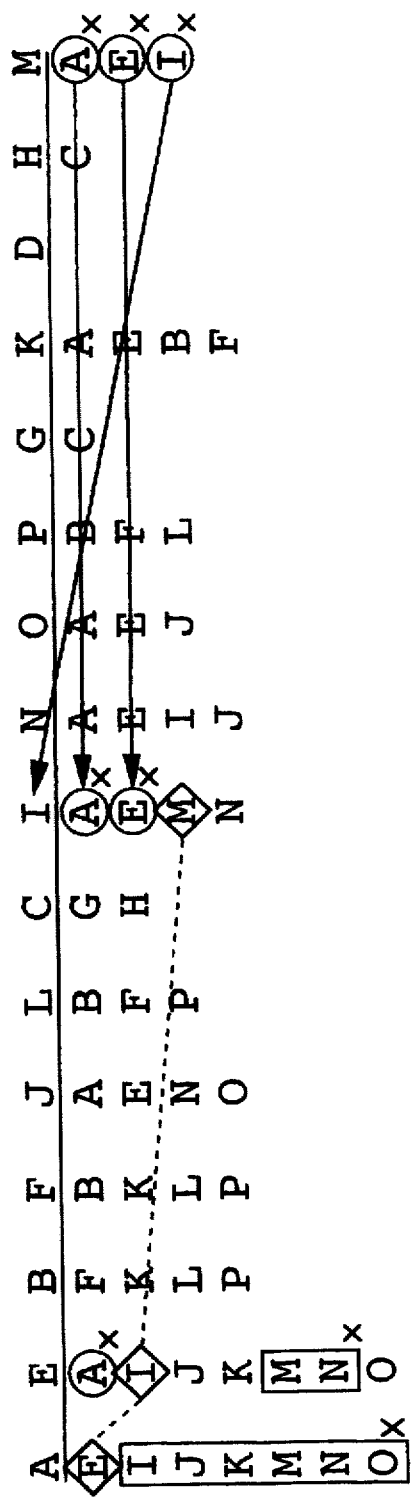
Figure 17:
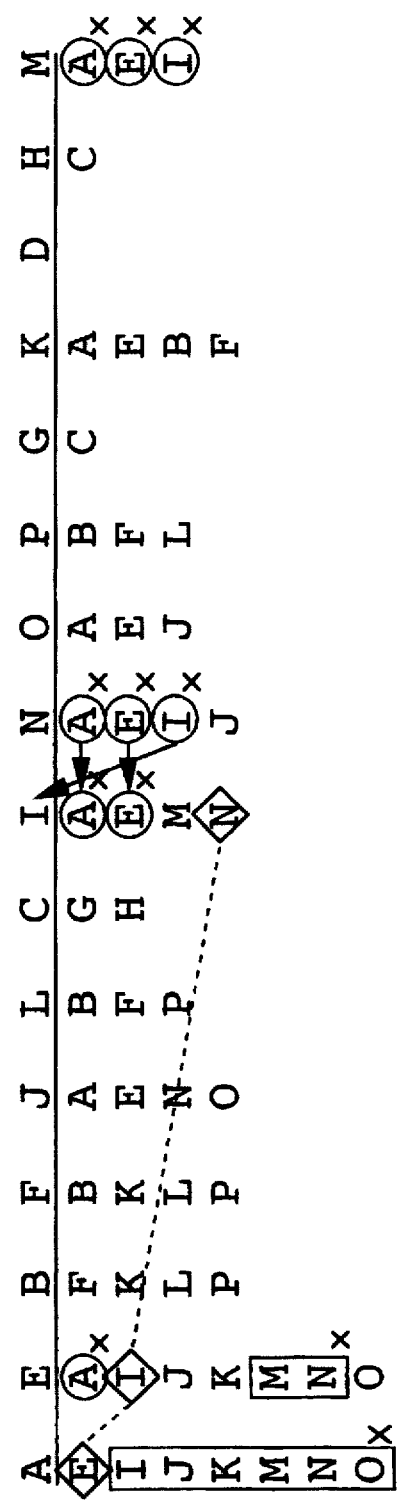
Figure 18:
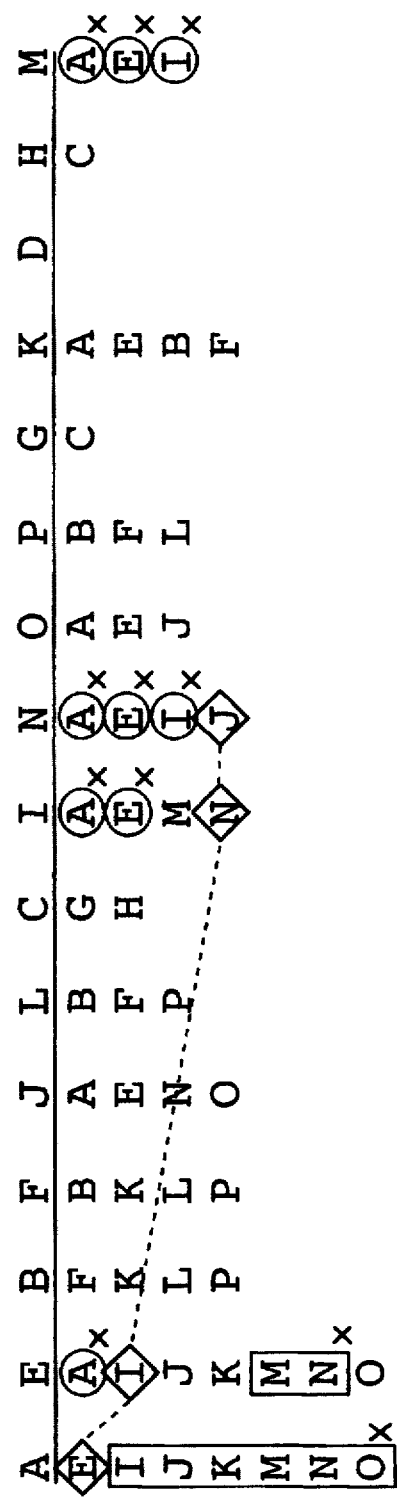
Figure 19:
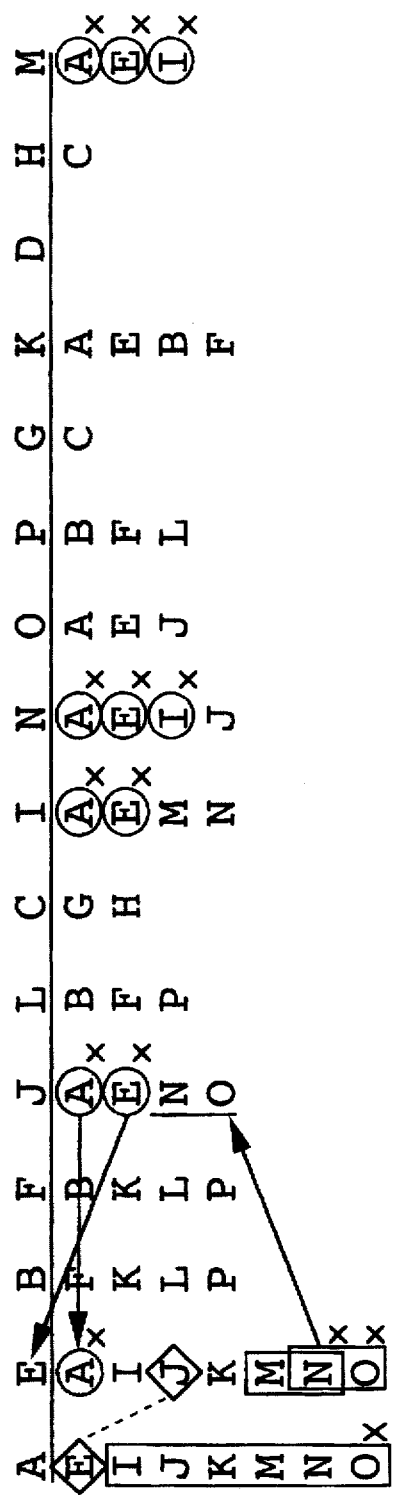
Figure 20:
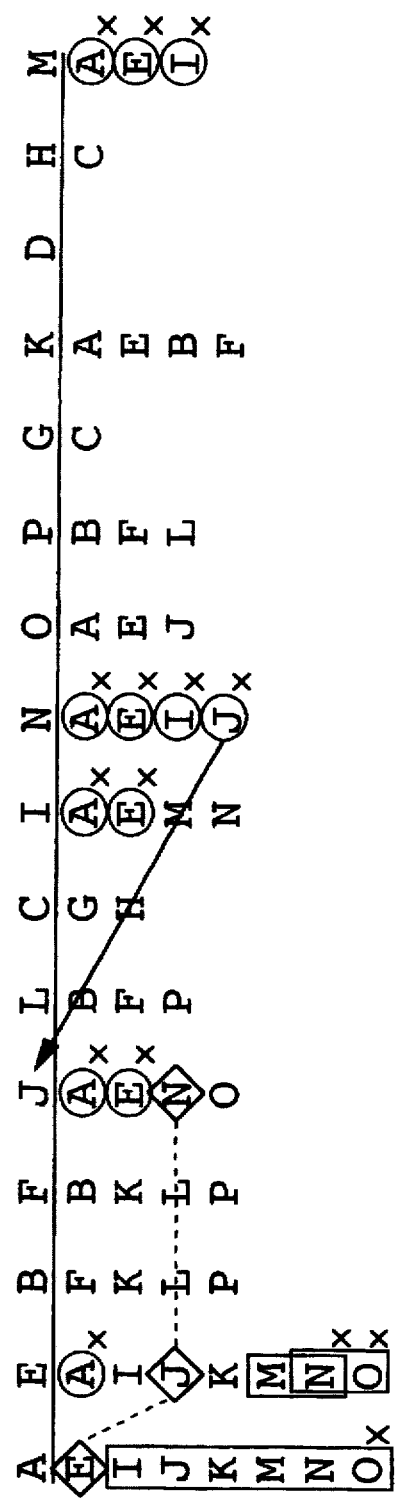
Figure 21:
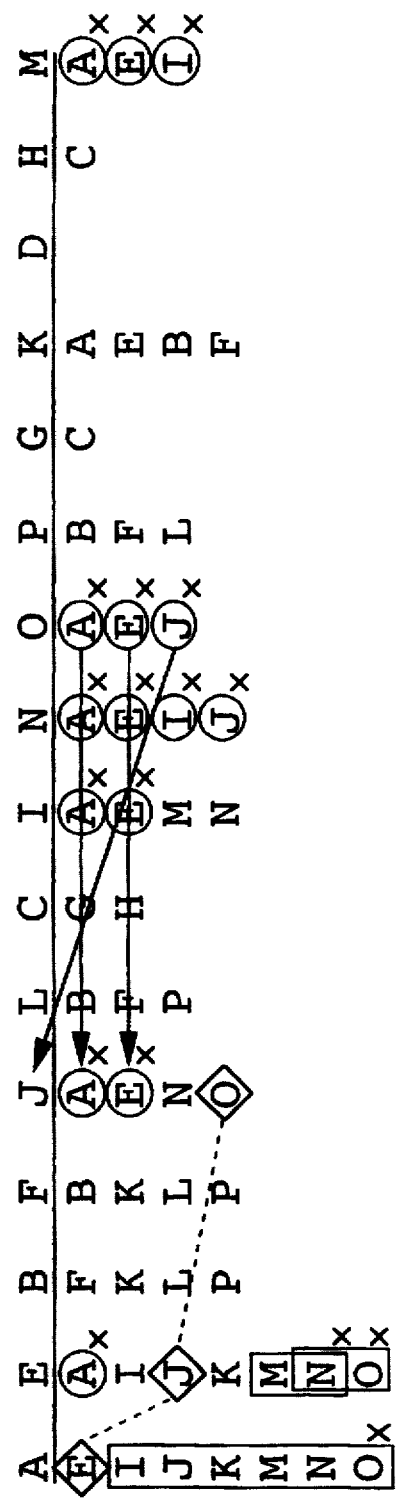
Figure 22:
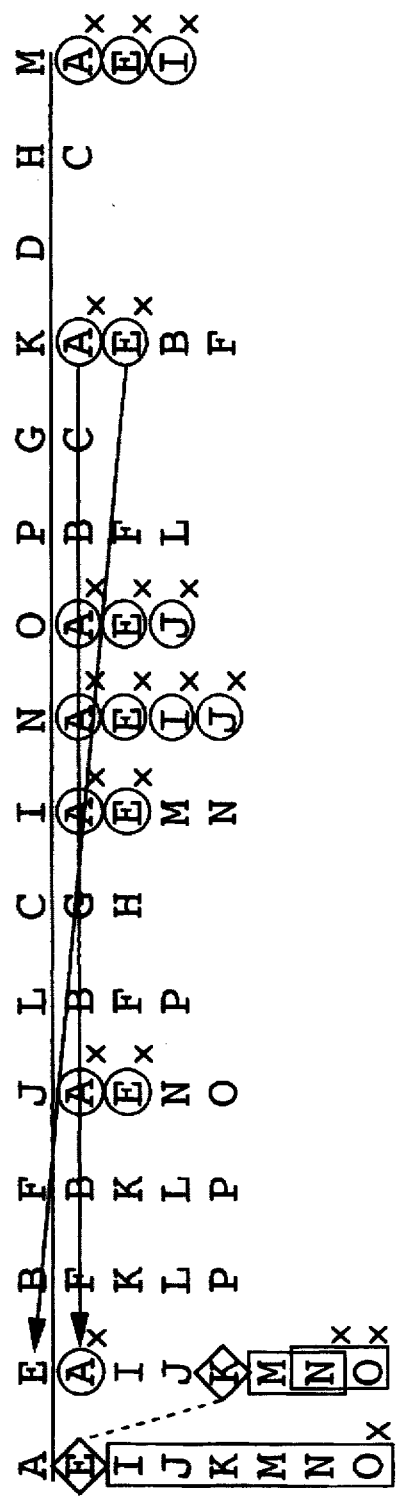
Figure 23:
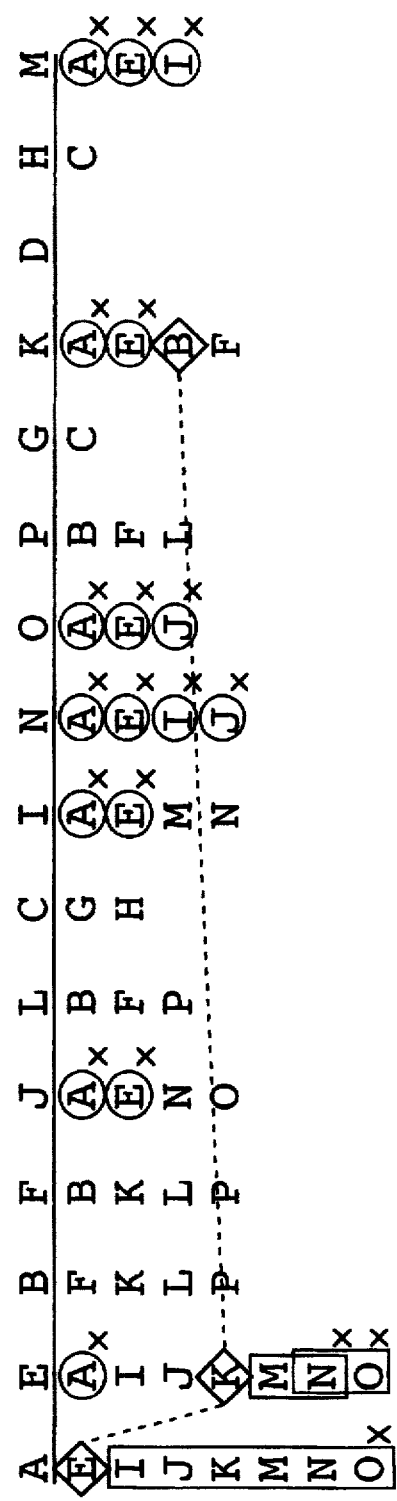
Figure 24:
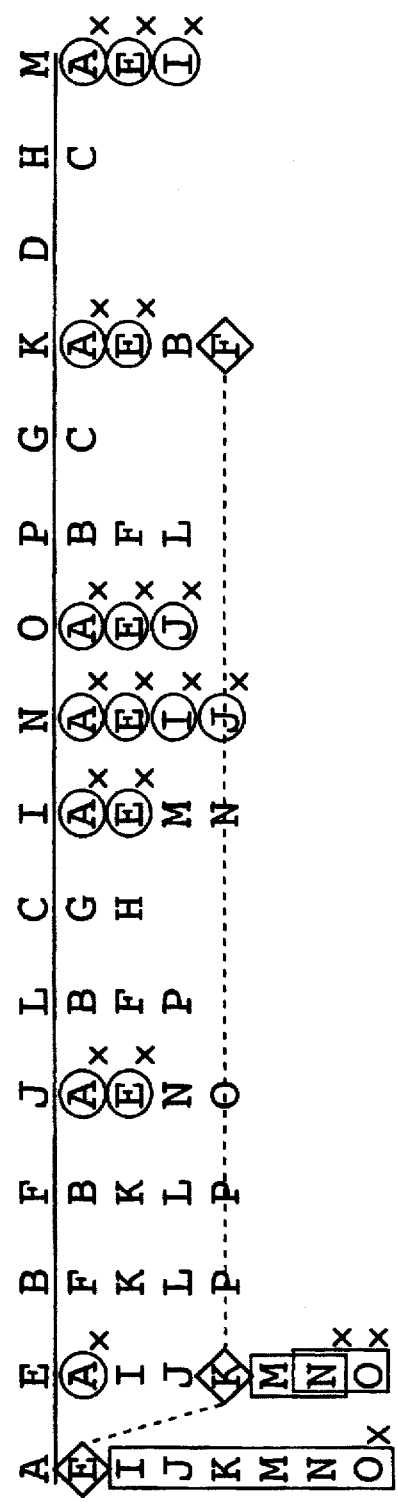
Figure 25:
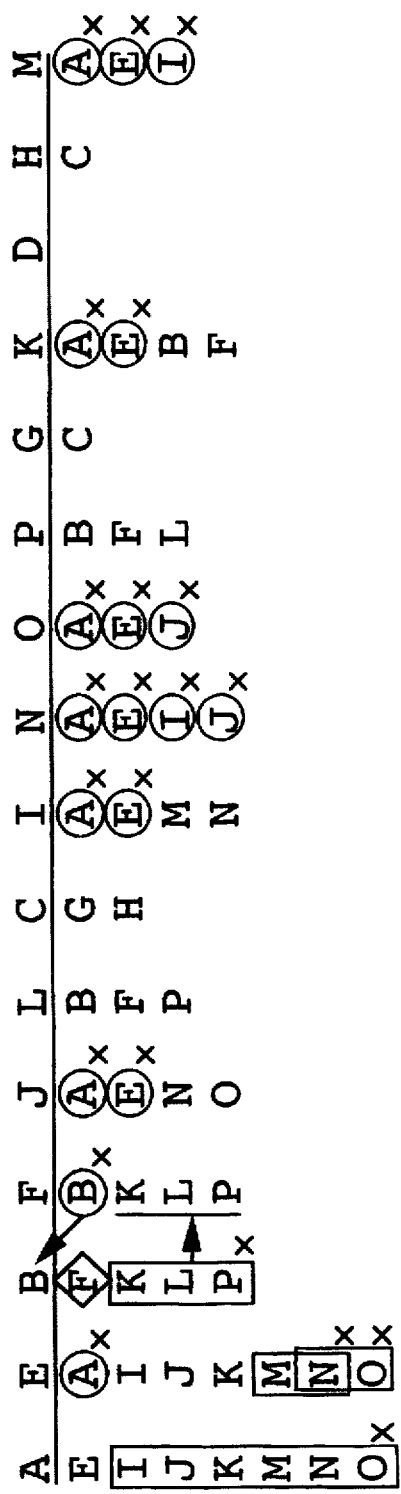
Figure 26:
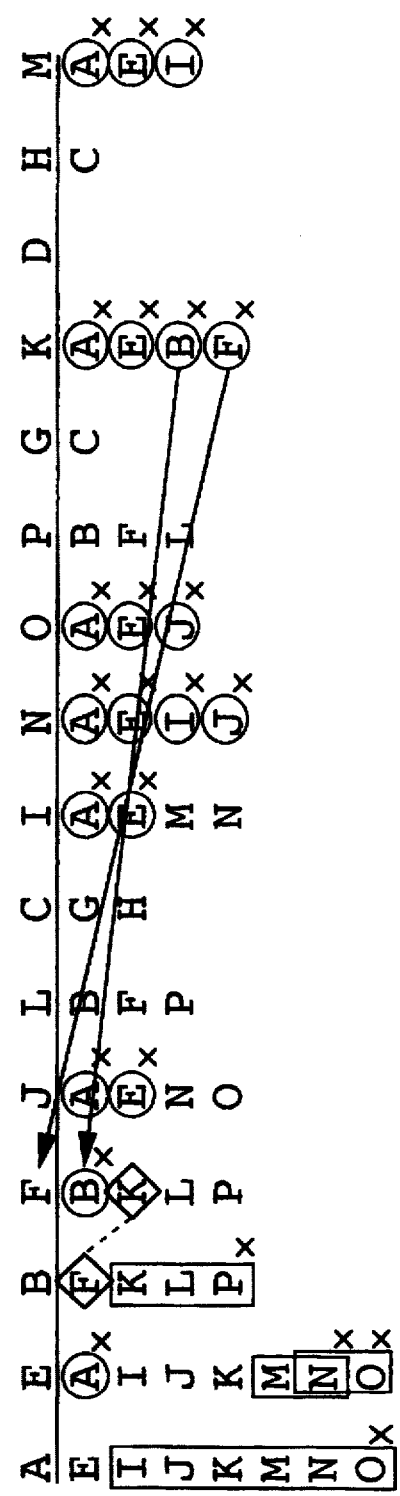
Figure 27:
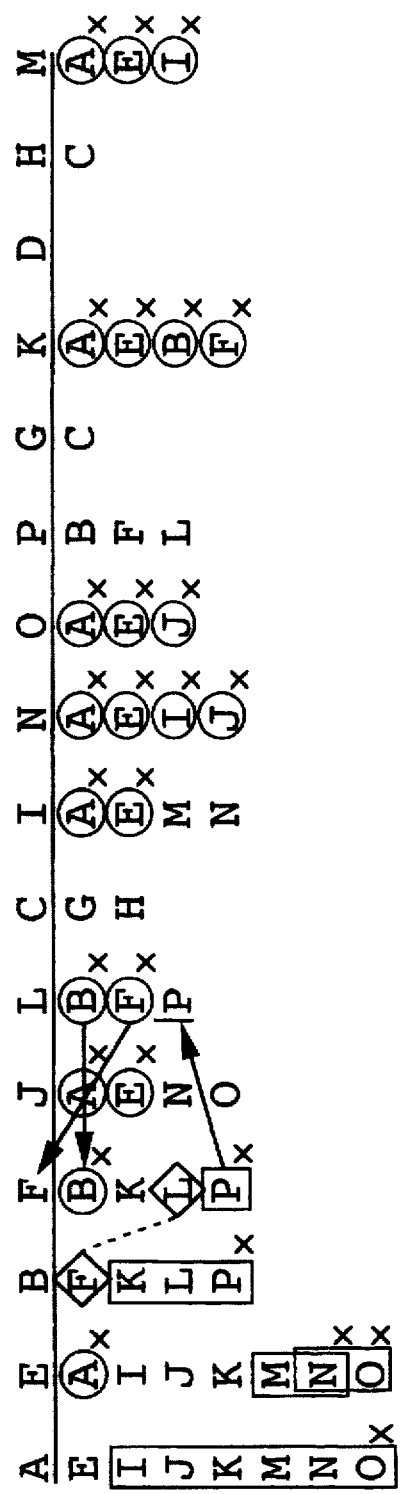
Figure 28:
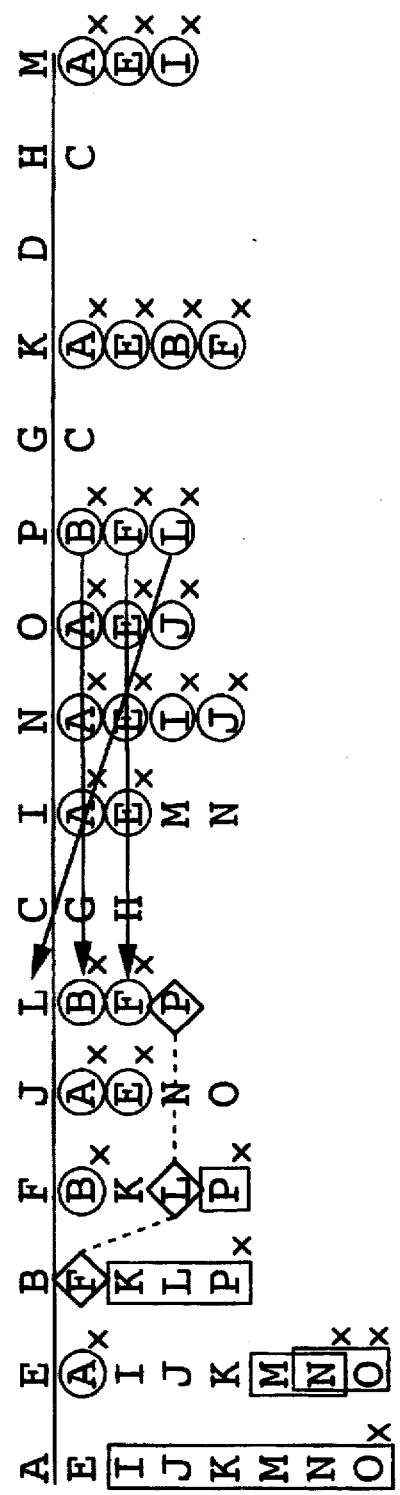
Figure 29:
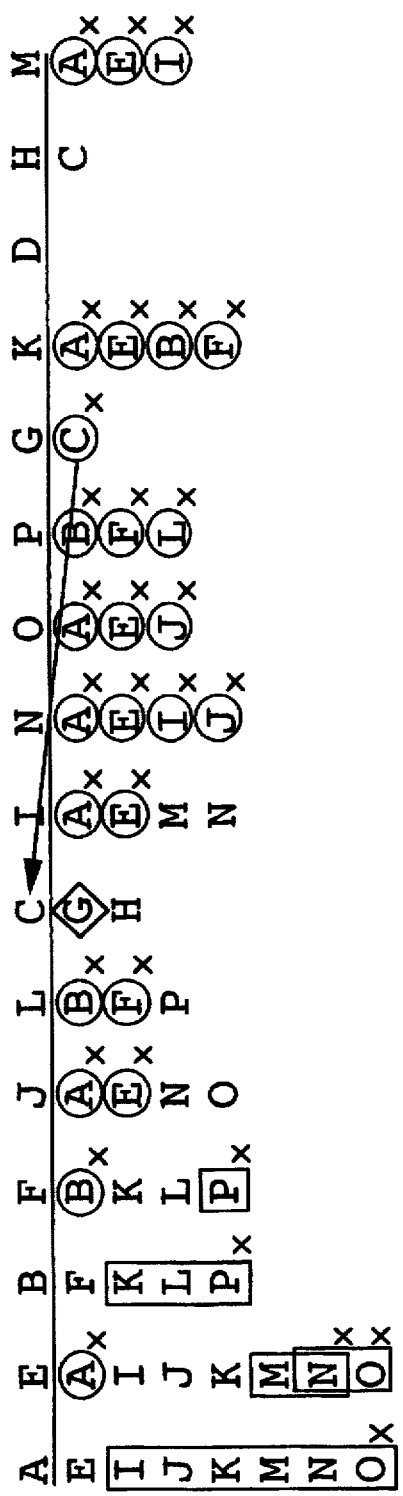
Figure 30:
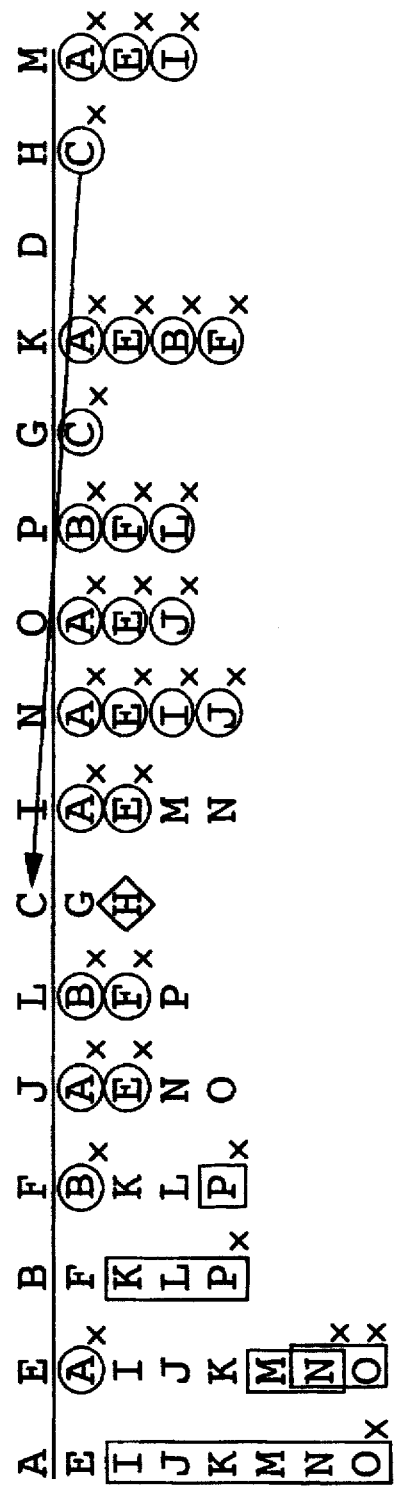
Figure 31:
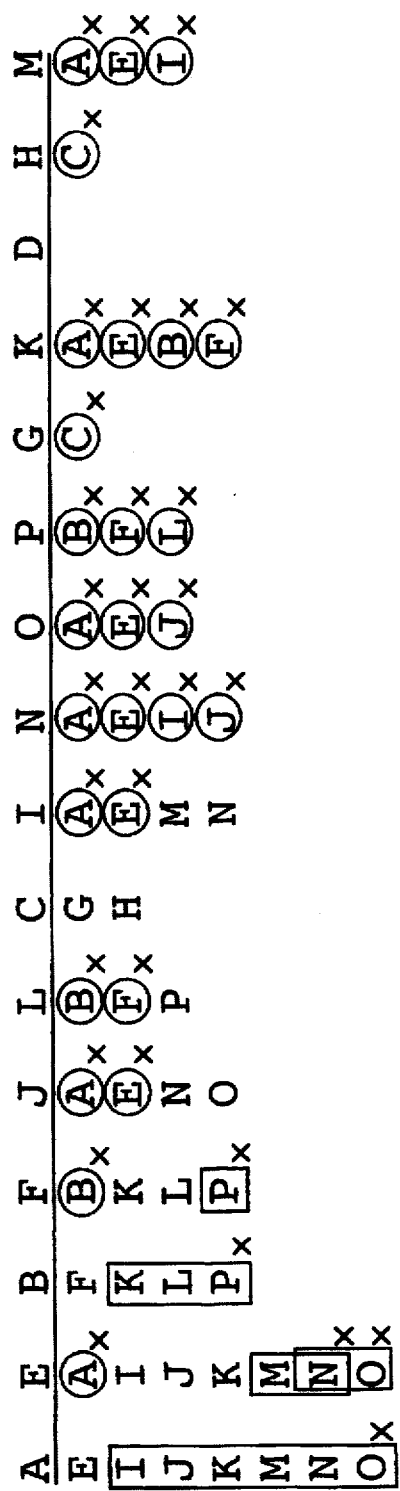

In FIG. 16, relation I's M, which links to relation M, is focused. Link A, link E and link I of relation M are ineffective, because they are the links which link to focused relations.

The above process is repeated, as shown in FIGS. 17 to 30. Finally, in FIG. 31, the links which are not marked with a cross are effective. The hierarchical structure of keywords is determined from these links. FIG. 10 shows the hierarchical structure. In FIG. 10, L1 means "highest level".

An information-classifying system is shown in FIGS. 1 to 9 and FIGS. 32 to 39. FIG. 39 illustrates samples of information display and selection. The system accepts input of information which have keywords.

Figure 1:
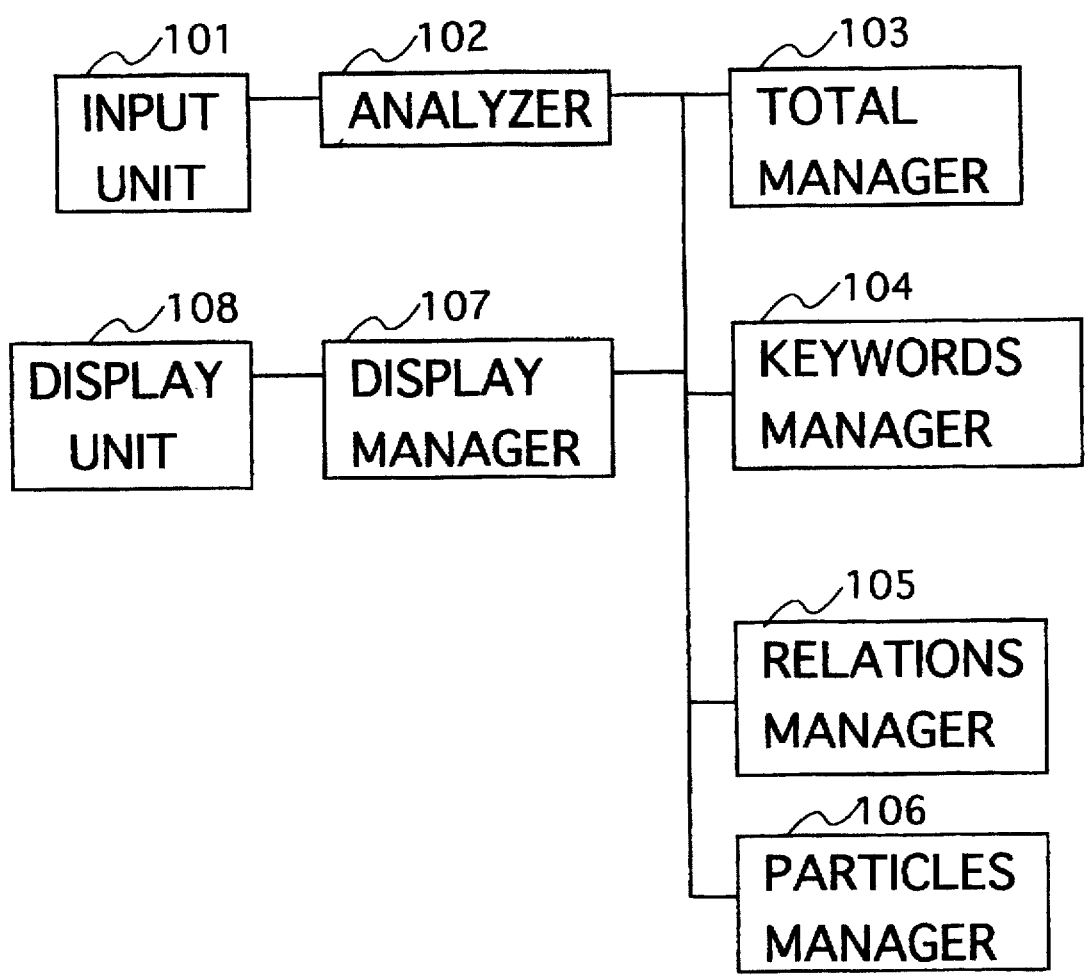
FIG. 1 is a block diagram of an information-classifying system.

FIG. 1 shows a block diagram of the information-classifying system.

Input unit 101 accepts commands to add information and accepts selections of relations and information.

Analyzer 102 provides notification of the commands to total manager 103.

Total manager 1 03 manages the components of this information-classifying system.

Keywords manager 104 memorizes, encodes and decodes keywords.

Relations manager 105 generates relations and discovers the hierarchical structure.

Particles manager 106 memorizes, retrieves and generates particles. A particle is generated each information. One particle is equal to the combination of keywords and an information.

Display manager 107 controls display unit 108.

Figure 2:
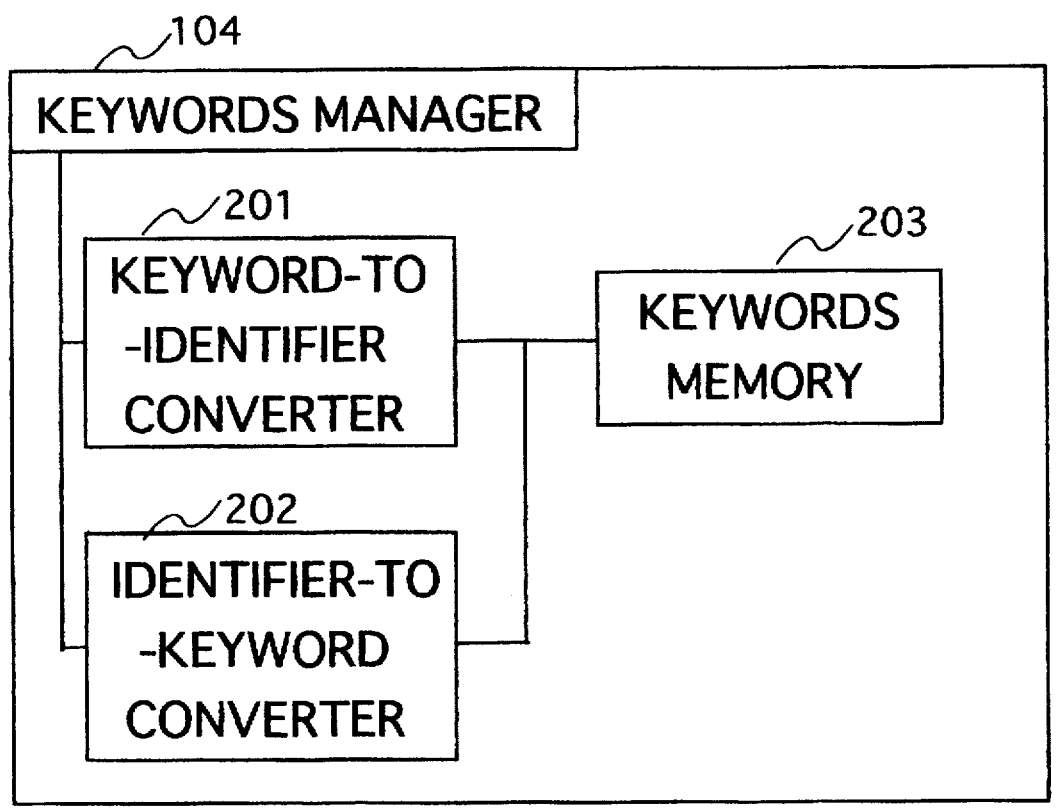
FIG. 2 is a block diagram of a keywords manager.

FIG. 2 shows keywords manager 104.

Keywords manager 104 accepts two types of request.

1. "Enter" request

Keyword-to-identifier converter 201 converts a keyword and returns an identifier.

If the keyword is not registered, keyword-to-identifier converter 201 registers the keyword.

2. "Retrieve" request

Identifier-to-keyword converter 202 converts an identifier and returns a keyword.

Figure 3:
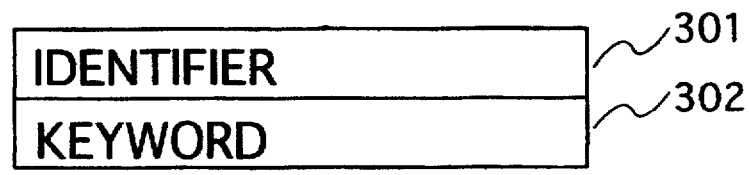
FIG. 3 is a combination of identifier and keyword, which is used by the keywords manager.

The combination of identifier 301 and keyword 302, shown in FIG. 3, is used by keyword-to-identifier converter 201 and identifier-to-keyword converter 202 in their conversion process.

Figure 4:
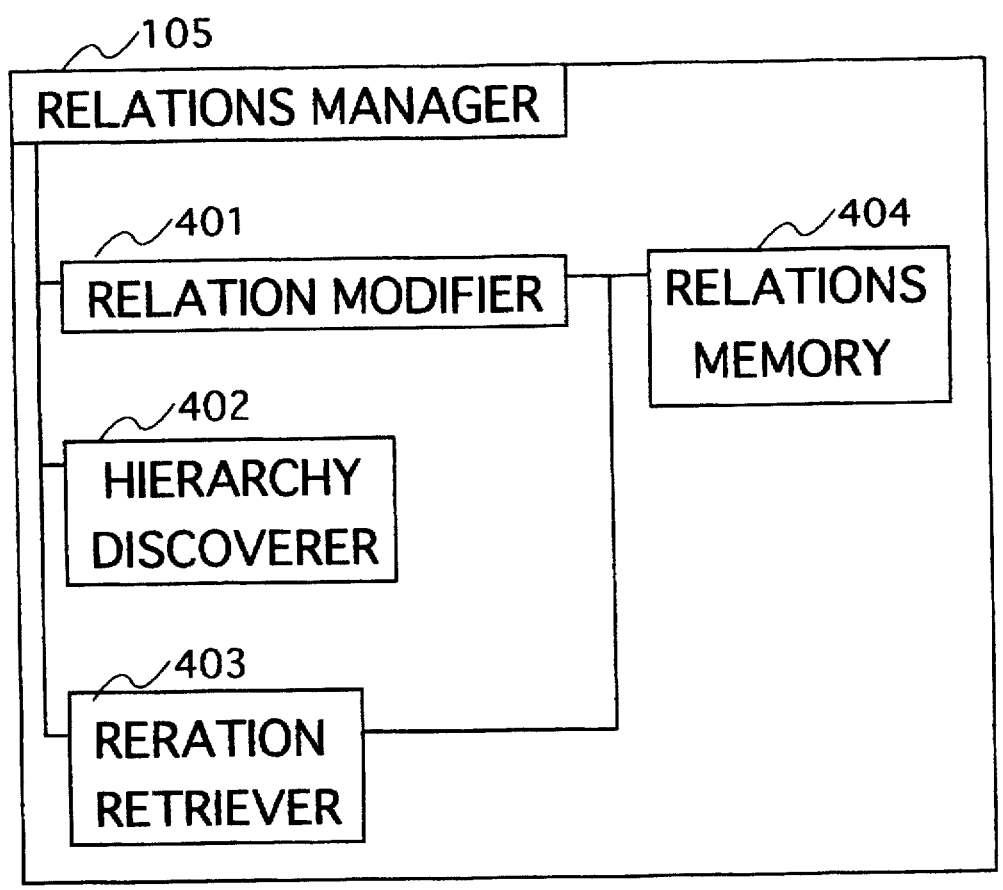
FIG. 4 is a block diagram of a relations manager.
Figure 5:
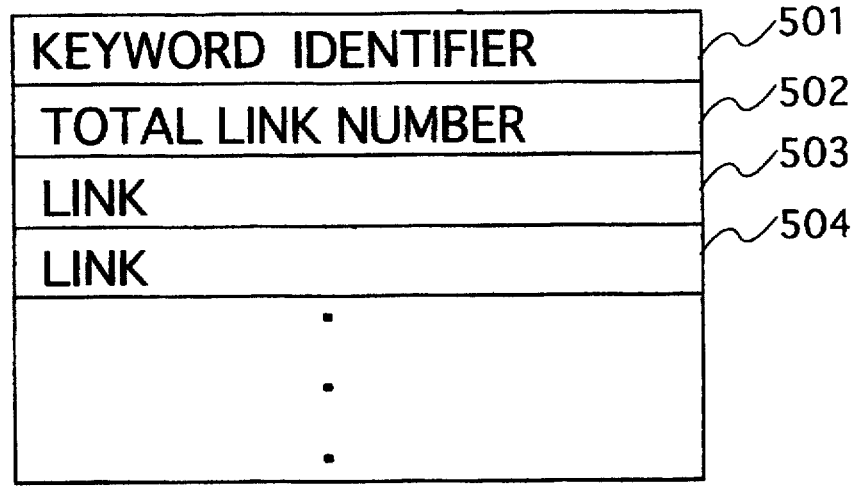
FIG. 5 is an illustration of a relation.
Figure 6:
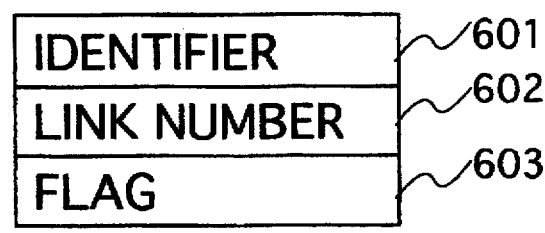
FIG. 6 is a illustration of a link.

FIG. 4 shows relations manager 105. A relation, which is shown in FIG. 5, comprises keyword identifier 501, total link number 502 and link array 503, 504 . . . A link, which is shown in FIG. 6, comprises identifier 601, link number 602 and flag 603.

Keyword identifier 501 identifies a keyword.

Total link number 502 is the sum of link numbers.

Identifier 601 identifies a particle or relation.

Link number 602 shows link thickness.

Flag 603 shows the relative position of a linked relation. Flag 603 is a four-valued flag:

1. the value "isHigher" means the linked relation is higher rank than this relation;
2. the value "isSame" means the linked relation is the same rank as this relation;
3. the value "isLower" means the linked relation is lower rank than this relation;
4. the value "isIncluded" means the link should be included in a lower relation.

Relations manager 105 accepts two types of request:

1. "Modify relation" request

Figure 9:
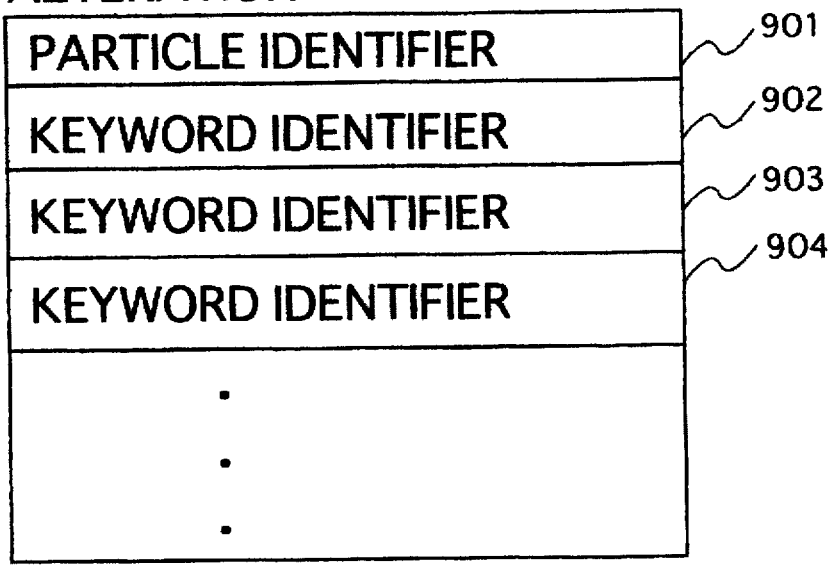
FIG. 9 is an illustration of an alteration.

When relation manager 105 accepts a modify relation request, relation modifier 401 modifies a link's identifier 601 and link number 602 using the alteration. An alteration is shown in FIG. 9.

Hierarchy discoverer 402 then discovers hierarchical structure.

2. "Retrieve relation" request

When relation manager 105 accepts a retrieve relation request, relation retriever 403 retrieves a relation.

Figure 38:
FIG. 38 is a chart that shows modification of relations.
Figure 39:
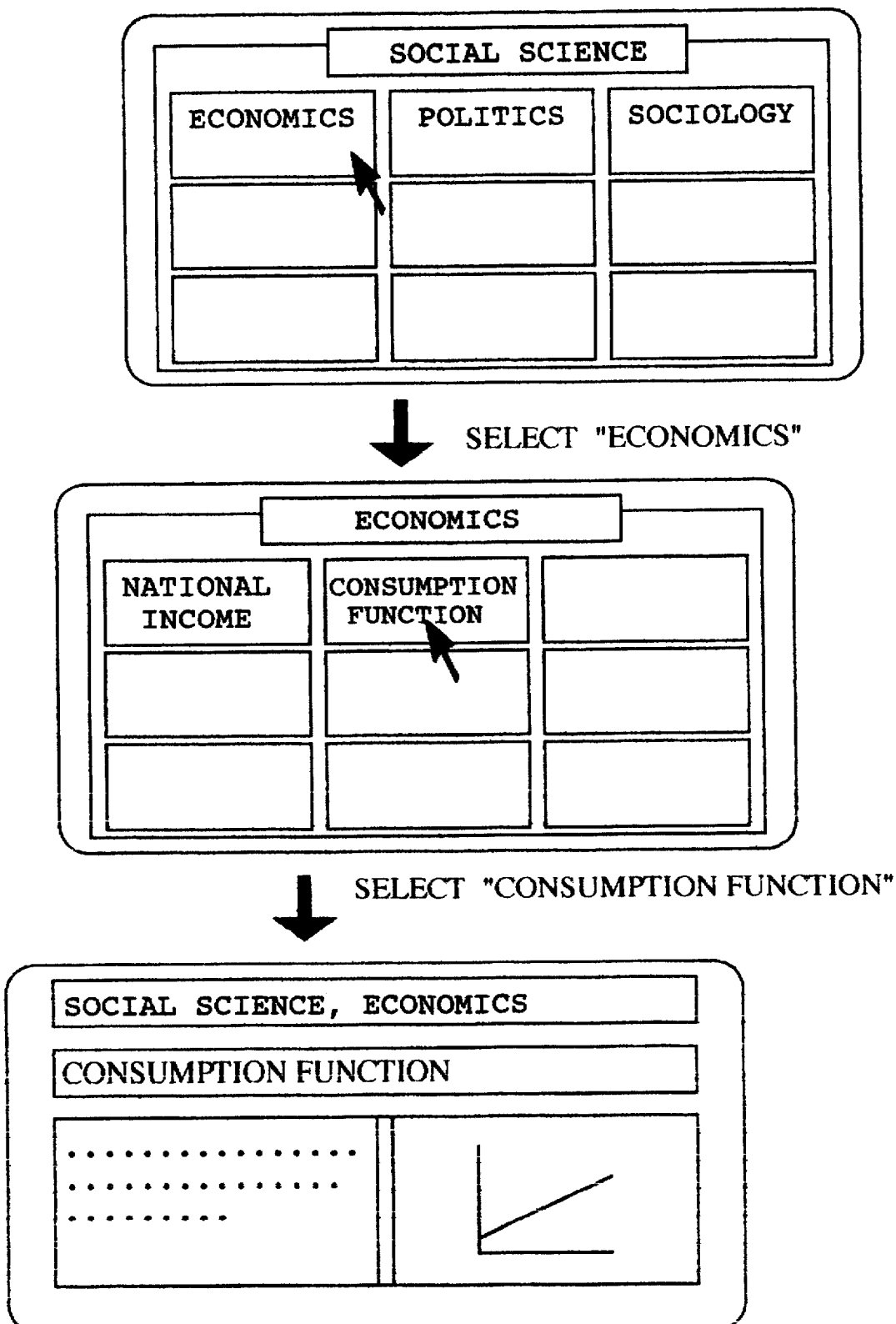
FIG. 39 is an illustration of information display and selection process.

FIG. 38 shows the relation modification process. In the figure, C . . . n means the relation's keyword identifier is n; L . . . means a link; L . . . Cm . . . n means a link links to the relation m and means the link number is n; L . . . Pn means a link links to the particle n.

When a new information is entered, a particle and alterations are created. In FIG. 38, the alteration is comprised of a particle identifier whose value is 2, first keyword identifier whose value is 1, second keyword identifier whose value is 2 and third keyword identifier w hose value is 4. Relation modifier 401 accepts the alteration, then modifies relations 1, 2 and 3, and creates relation 4.

Relation 1 is comprised as follows:
 a keyword identifier whose-value is 1;
 a first link to relation 2 with link number 1;
 a second link to relation 3 with link number 1;
 and a third link to particle 1.

After entering information, the link number of the first link of relation 1 increases, and links to relation 4 and particle 2 are added to relation 1.

Relation 2 is comprised as follows:
 a keyword identifier whose value is 2;
 a first link to relation 1 with link number 1;
 a second link to relation 3 with link number 1;
 and a third link to particle 1.

After entering a information, the link number of the first link of relation 2 increases, and links to relation 4 and particle 2 are added to relation 2.

Since the alteration has no a keyword identifier whose value is 3, relation 3 is not influenced. And, because the alteration has a keyword identifier w hose value is 4, and there was not relation 4, relation 4 is created.

Figure 36:
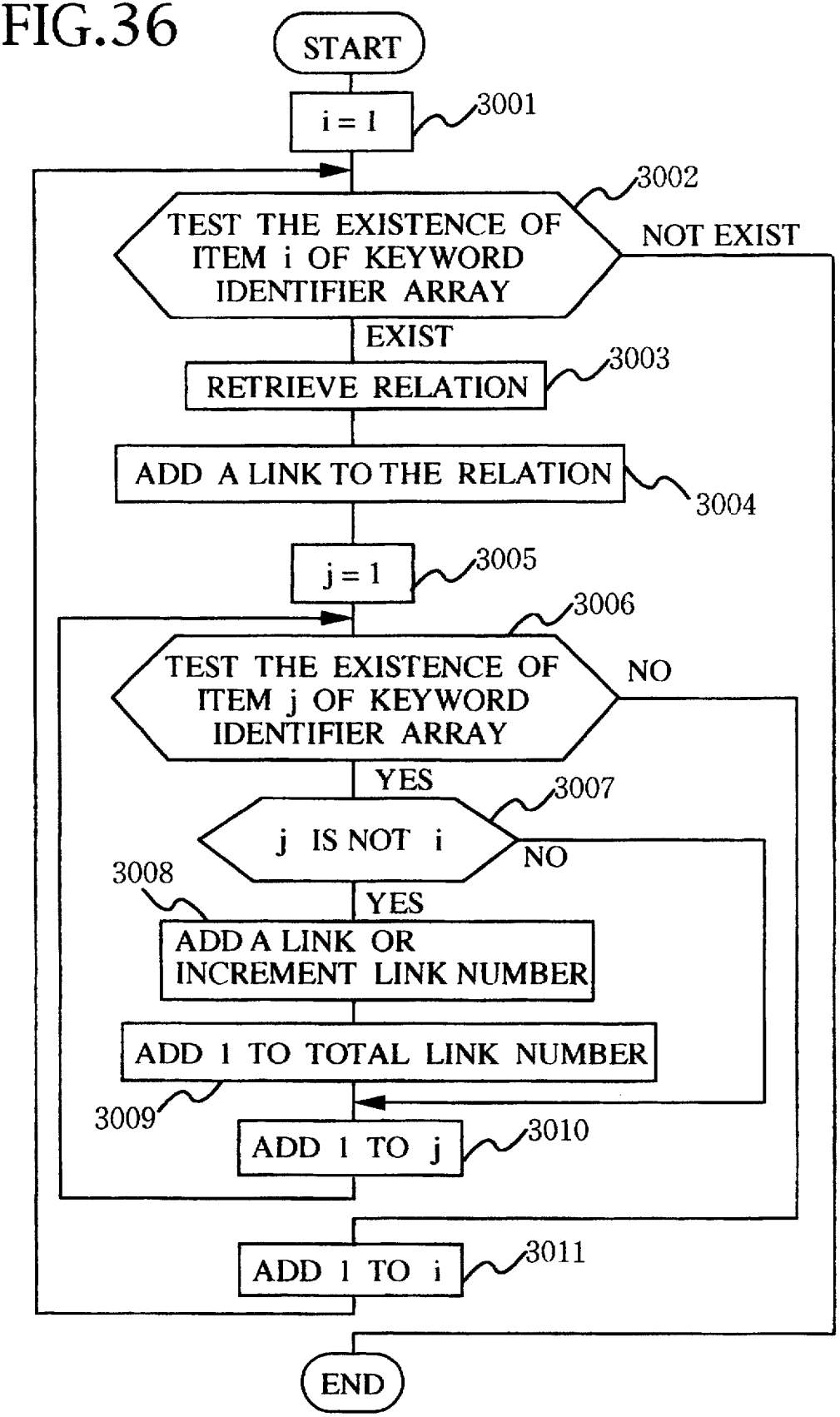
FIG. 36 is a flowchart of an algorithm used to modify relations.

The relation modification algorithm is shown in FIG. 36.
Initial value of i is set to 1 in box 3001.

In decision box 3002, the existence of item i of keyword identifier array of the alteration is tested.

If the keyword identifier does not exist, the relation modification process is ended.

If the keyword identifier exists, relation retriever 403 is requested to retrieve a relation whose keyword identifier is same as item i of keyword identifier array of the alteration in box 3003.

If the requested relation does not exist, relation retriever 403 creates it; the created relation's keyword identifier is set to the same value as item i of the keyword identifier array of the alteration; the created relation's total link number is set to 0.

When a new information is entered, the requested relation does not link to the particle. In box 3004, therefore, a link to the particle is added to the relation; the link's link number is set to 1. Also, the total link number of the relation is incremented.

Then, initial value of j is set to 1 in box 3005.

In decision box 3006, the existence of item j of keyword identifier array of the alteration is tested.

If not exist, increment i in box 3011 and go to box 3002.

If exist, compare i with j in decision box 3007.

If same, go to box 3010.

If i is different from j, a link whose identifier is the same as item j of the keyword identifier array of the alteration, is added to the relation or link number of the link is incremented in box 3008.

In box 3009, the total link number is incremented.

In box 3010, increment j and go to decision box 3006.

Figure 37:
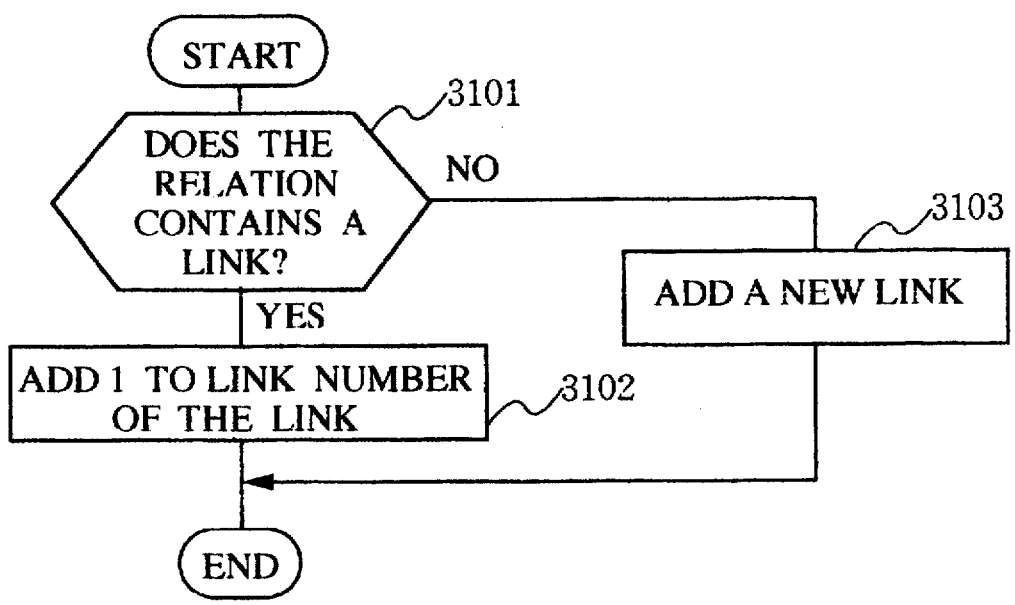
FIG. 37 is a detailed flowchart of box 3008.

FIG. 37 shows a detailed process of box 3008.

In box 3101, test whether the relation contains a link whose identifier is same as item j of the keyword identifier array of the alteration.

If the relation contains the link, increment the link number of the link in box 3102.

If not, add a new link, with link number 1, to the relation in box 3103.

The new link links to a relation whose keyword identifier is the same as item j of the keyword identifier array of the alteration.

Figure 35:
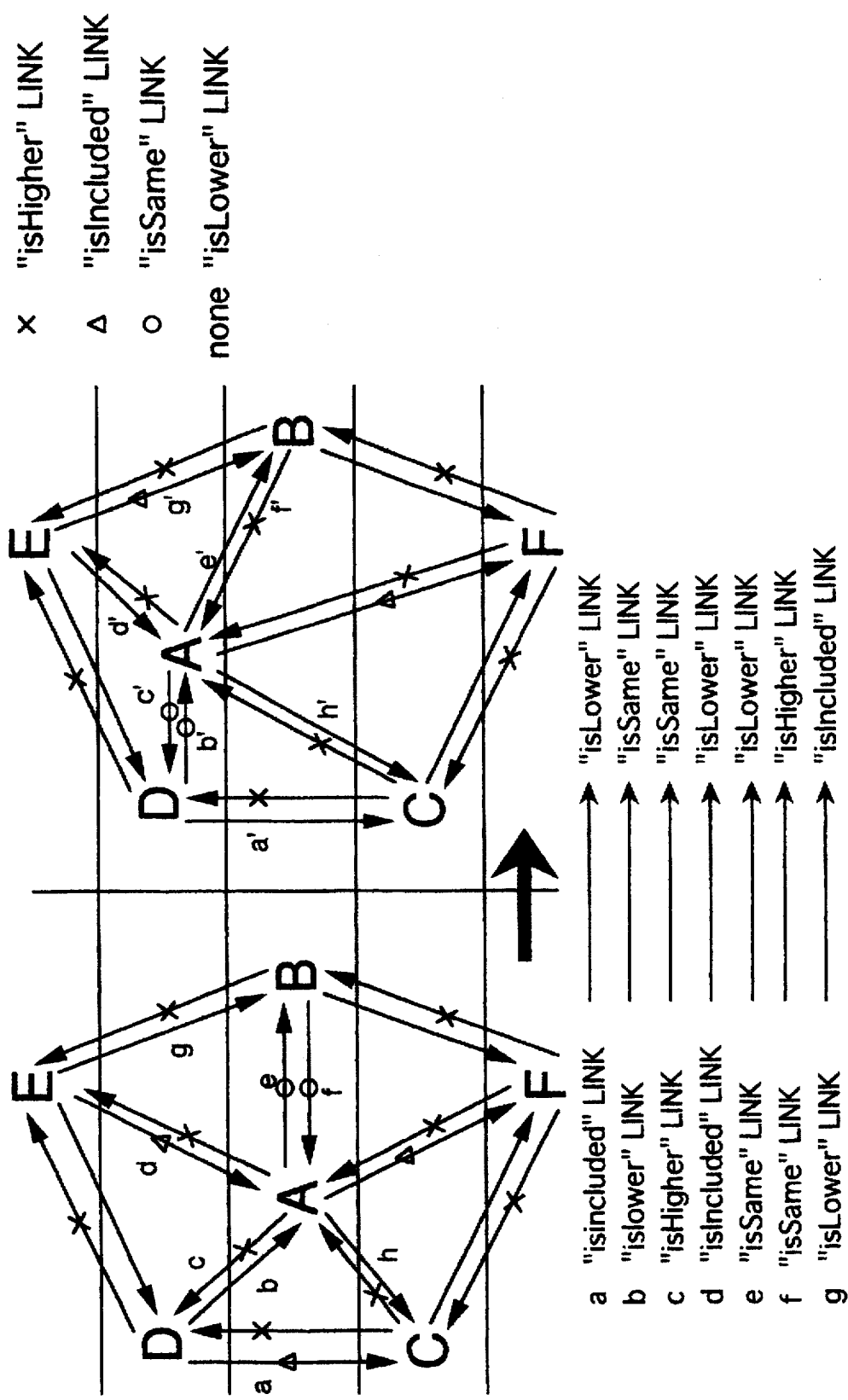
FIG. 35 is a chart that shows the concept of hierarchical discovery.

The concept of hierarchical discovery is shown in FIG. 35.

In FIG. 35, there are relations A, B, C, D, E and F; relations have links described as arrows; total link number of relation A changes.

Arrows such as the arrow from relation D to E in FIG. 35 are marked with a cross; the cross means that the destination of the arrow is of higher rank and the link's flag is set to "isHigher". We call this an "isHigher" link.

An arrow marked with a triangle means a link whose link's flag is set to "isIncluded". We call this an "isIncluded" link.

An arrow marked with a circle means a link whose link's flag is set to "isSame". We call this an "isSame" link.

An arrow marked with nothing means a link whose link's flag is set to "isLower". We call this an "isLower" link.

In FIG. 35, relation A goes to a higher rank and the flags of some links change.

The link, marked with "a", was an "isIncluded" link, because:

relation A was a lower-rank relation than relation D;

relation A was a higher-rank relation than relation C;

relation D had links to relation A and relation C; and relation A has a link to relation C.

After relation A's promotion the link marked with "a", becomes an "isLower" link which is marked with "a'", because:

relation A becomes the same rank as relation D; and there is not a relation which is lower rank than relation D, higher rank than relation C, and linked from relation D and to relation C.

The links marked with "b" and "c" become "isSame" links, because relation A becomes the same rank as relation D.

The link marked with "d" becomes an "isLower" link, because there is no relation which is lower rank than relation E and higher rank than relation A.

The link marked with "e" becomes an "isLower" link.

The link marked with "f" becomes an "isHigher" link.

The link marked with "g" becomes an "isIncluded" link, because:

relation A is lower rank than relation E;

relation A is higher rank than relation B;

relation E has links to the relation A and relation B; and relation A has a link to relation B.

If there was a link from relation B to relation C, the link marked with "h" would become an "isIncluded" link.

Figure 32:
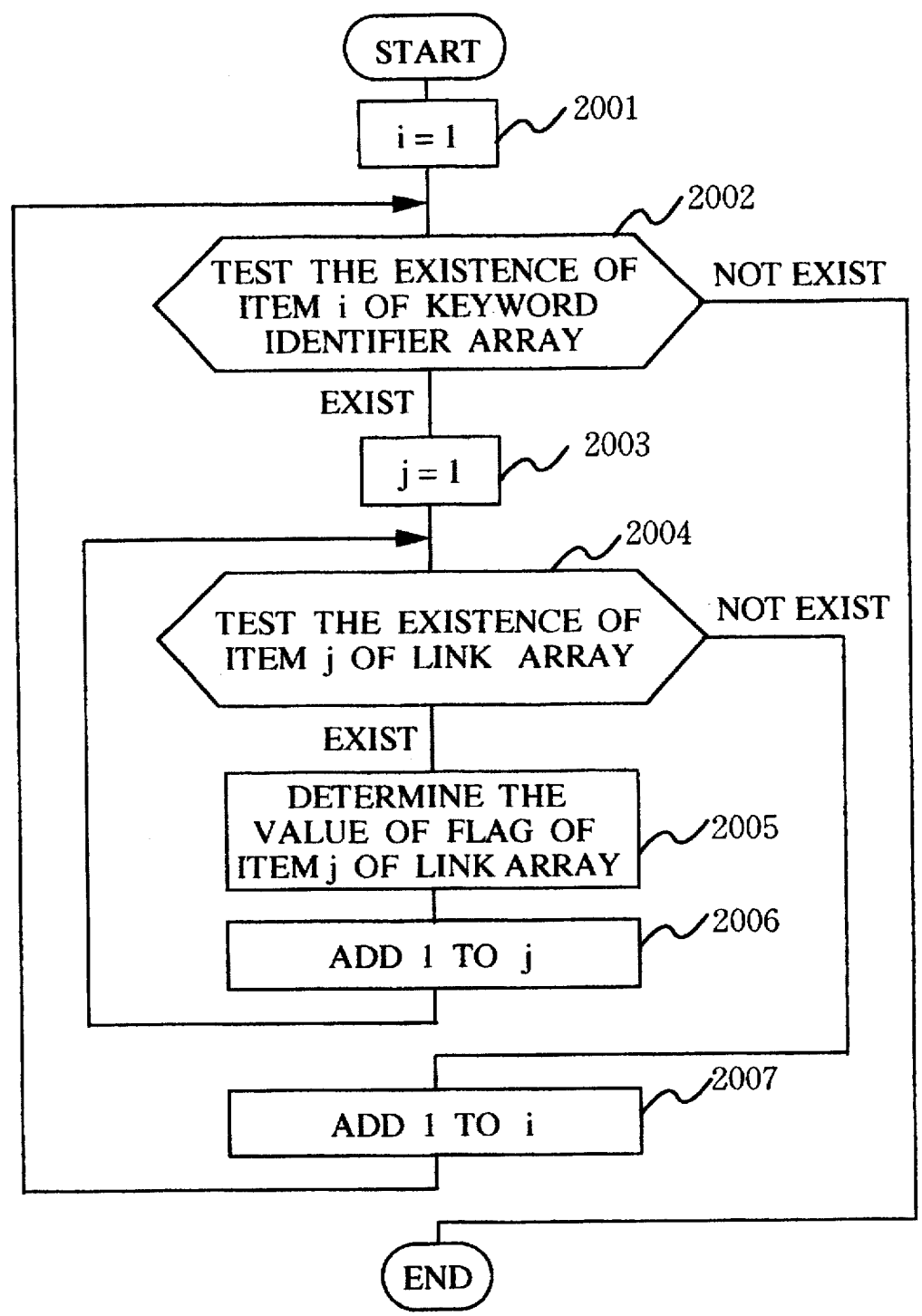
FIG. 32 is a flow chart of an algorithm used to discovering the hierarchical structure of keywords.

FIG. 32 shows the hierarchical discovery algorithm.

In box 2001, the initial value of i is set to 1.

In box 2002, test the existence of item i of the keyword identifier array of the alteration.

If item i of the keyword identifier array does not exist in the alteration, terminate the hierarchical discovery process.

If item i of the keyword identifier array exists in the alteration, retrieve a relation whose keyword identifier is same as item i of keyword identifier array of the alteration from relations memory 404, in box 2002.

In box 2003, the initial value of j is set to 1.

In box 2004, test the existence of item j of the retrieved relation's link array.

If item j does not exist in the relation, increment i in box 2007.

If item j exists in the relation, determine the value of the flag of item j, in box 2005.

In box 2006, increment j, and go to box 2004.

Figure 33:
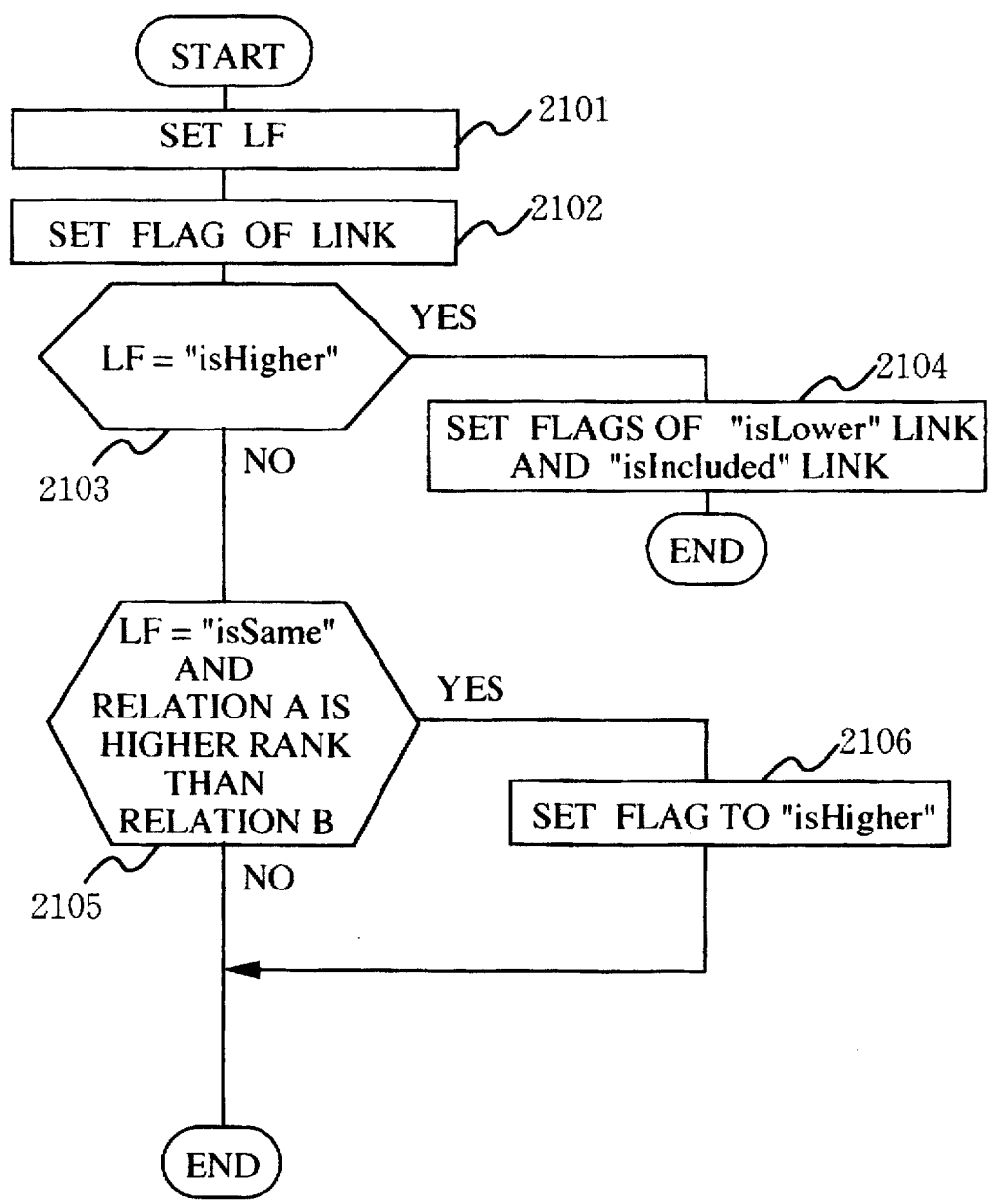
FIG. 33 is a detailed flowchart of box 2005.

FIG. 33 shows the determination process for the link's flag in box 2005.

In this flow chart, suppose that relation A is the relation retrieved in box 2002, and that item j of relation A's link array is a link which links to relation B.

In box 2101, set LF to the same flag value as item j of relation A's link array.

In box 2102, set the flag of item j of relation A's link array to appropriate value.

In box 2103, test the value of LF.

If the value of LF is "isHigher", set the flags of relation B's "isLower" links and "isIncluded" links in box 2104.

If the value of LF is "isSame" and relation A is of higher rank than relation B, set the flag of relation B's link to relation A to "isHigher" in box 2106.

The link's flag shows relativity of two relations. This information-classifying system decides the relativity from a comparison of the two relation's total link number.

If 0.9 TLX (relation X's total link number)>TLY (relation Y's total link number) , relation X is of higher rank than relation Y.

If 0.9 TLY>TLX, relation Y is of higher rank than relation X.

Else, relation X is the same rank as relation Y.

Figure 34:
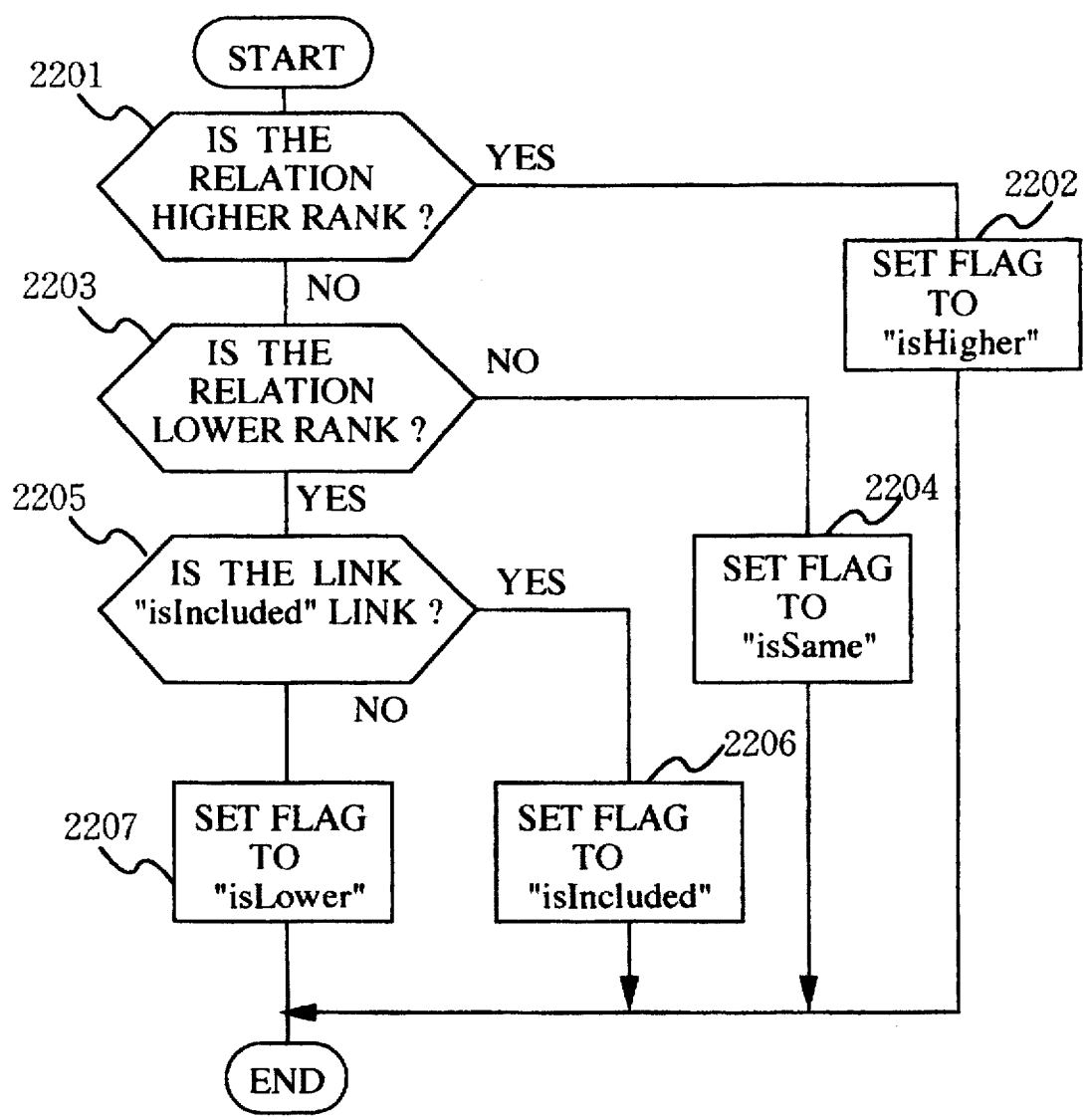
FIG. 34 is a detailed flowchart of box 2102.

FIG. 34 shows details of the process in box 2102.

In decision box 2201, test the condition that relation B is of higher rank than relation A.

If the condition is true, set the flag of relation A's link to relation B to "isHigher" in box 2202.

If the condition is not true, step into box 2203.

In decision box 2203, test the condition that relation B is of lower rank than relation A.

If the condition is not true, set the flag of relation A's link to relation B to "isSame" in box 2204.

If the condition is true, step into box 2205.

In decision box 2205, test the condition:

relation B is of lower rank than relation A;

relation C exists and is of higher rank than relation B;

relation C is of lower rank than relation A;

relation A has a link to relation C;

relation C has a link to relation B.

If the condition is true, set the flag of relation A's link to relation B to "isIncluded" in box 2206.

If the condition is not true, set the flag of relation A's link to relation B to "isLower" in box 2207.

Figure 7:
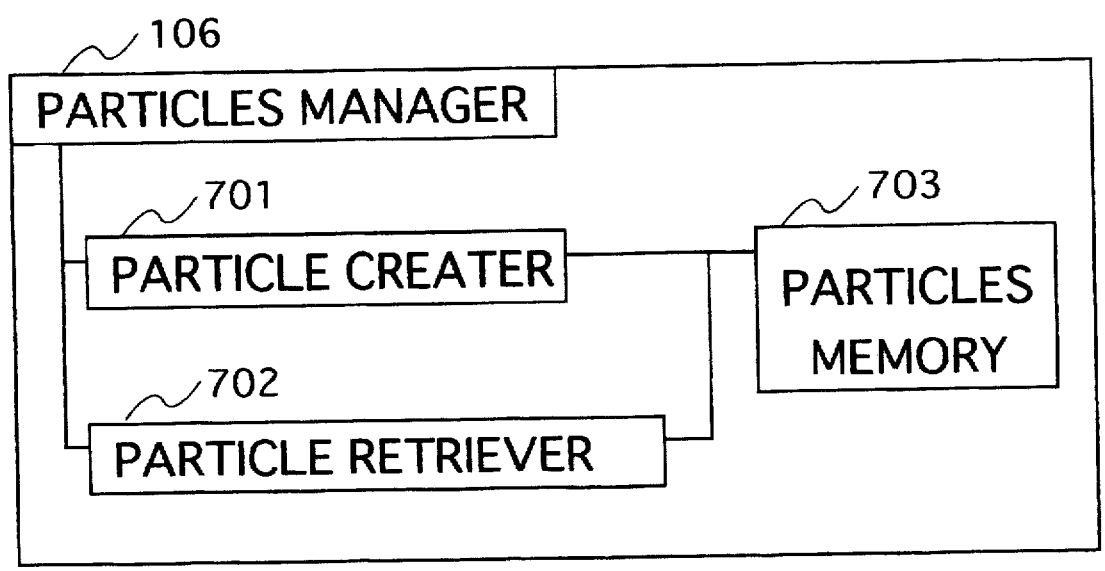
FIG. 7 is a block diagram of a particles manager.

FIG. 7 shows the particles manager.

The particles manager manages particles.

Figure 8:
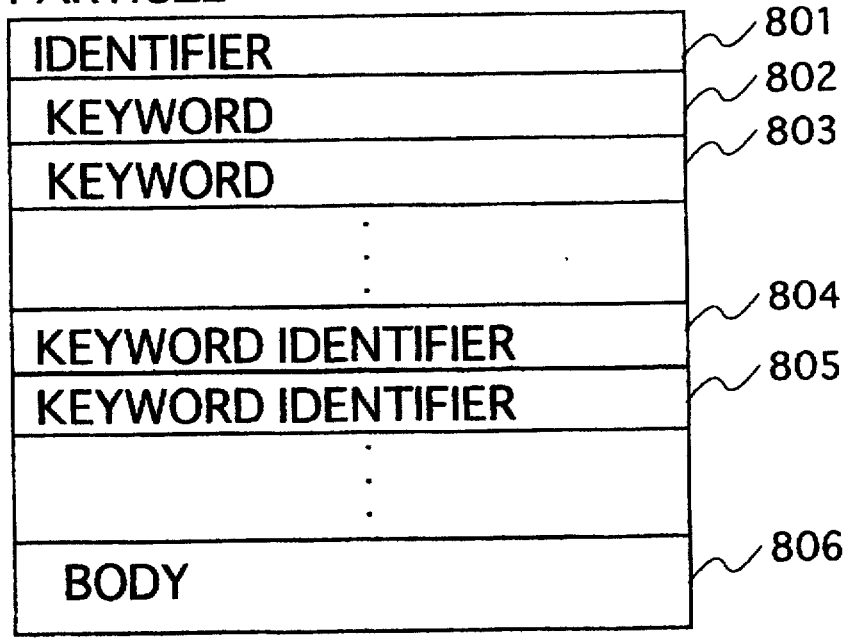
FIG. 8 is an illustration of a particle.

As described in FIG. 8, a particle comprises identifier 801, keyword array 802, 803 . . . , keyword identifier array 804, 805 . . . , and body 806.

Identifier 801 is a identification number which distinguishes one particle from another.

Keyword identifier 804, 805, . . . are identification numbers which identify keywords.

The main part of a particle is body 806, which comprises text data and picture data.

The particle manager accepts two types of requests.

1. "Enter" request

Particle creator 701 decides an identification number, sets the identifier 801 of particle to the number, sets the particle identifier 901 of alteration to the number, requests keywords manager 104 to enter the keywords, accepts return values from keywords manager 104, sets particle's keyword identifiers 804, 805 ... to those values, sets alteration's keyword identifiers 902, 903, 904 ... to those values, registers the particle to particles memory 703 and returns the alteration.

2. "Retrieve" request

Particle retriever 702 retrieves a particle with an identifier and returns it.

Analyzer 102 analyzes input and sends its results to total manager 103.

Total manager 103 accepts the results from analyzer 102 and requests other components to act.

When total manager 103 accepts a particle input indication from analyzer 102, total manager 103 requests particles manager 106 to enter the particle.

Particles manager 106 returns an alteration, then total manager 103 requests relations manager 105 to modify relation.

When total manager 103 accepts a select indication from analyzer 102 with an identifier, total manager 103 requests relations manager 105 to retrieve the relation or requests particles manager 106 to retrieve the particle. Total manager 103 prepares display data and requests display manager 107 to display it.

Figure 40:
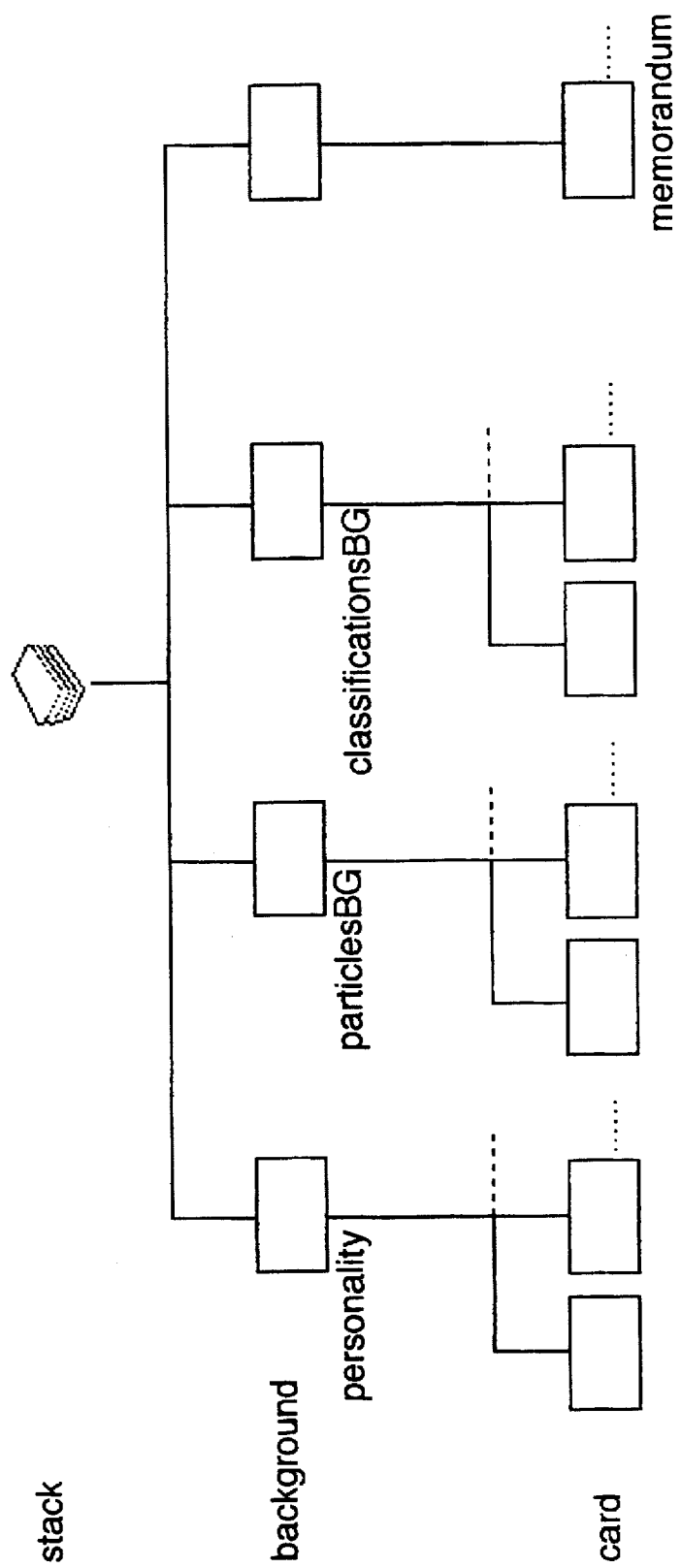
FIG. 40 is a chart stack structure.

FIGS. 40 to 69 show another information-classifying system. The system runs on an Apple Computer_™ PowerBook_™ 520 with HyperCard_™J-2.2. The system may also runs on other Macintosh_™ with HyperCard_™ 2.2. FIG. 40 shows the structure of its information-classifying stack.

The stack consists of background "personality", background "particlesBG", background "classificationsBG" and an unnamed background.

Figure 41:
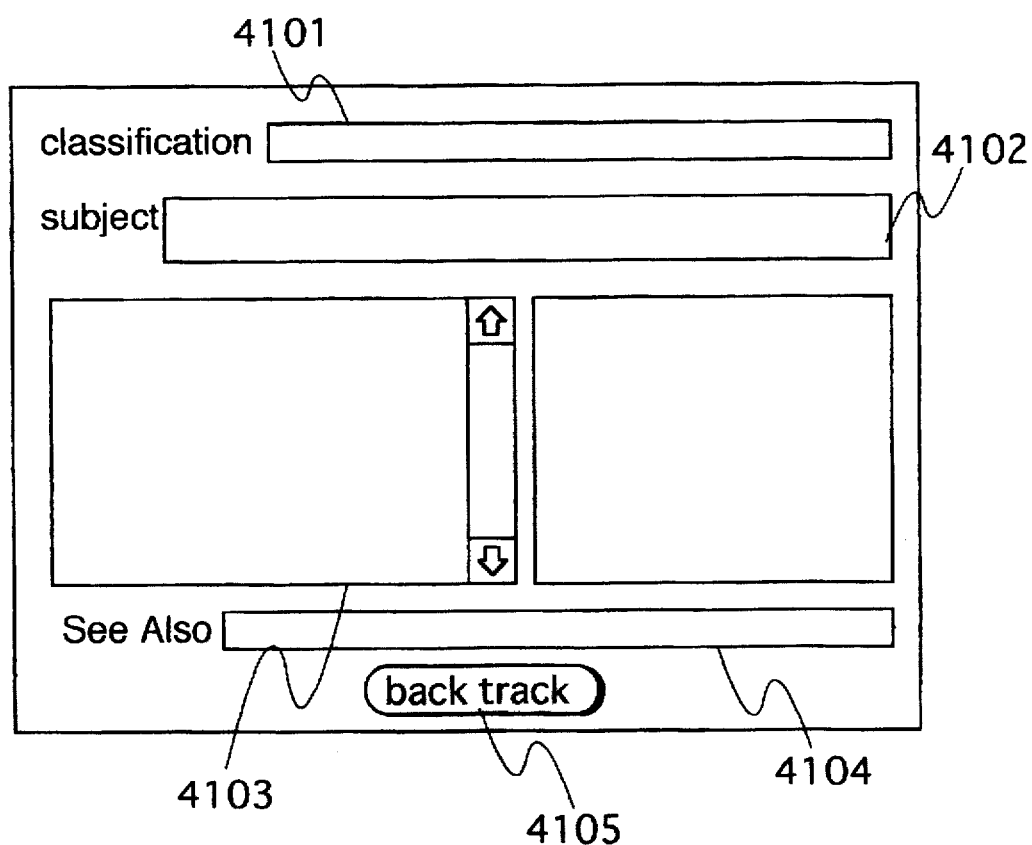
FIG. 41 is a chart of background "personality".

FIG. 41 shows the background "personality", which comprises a field "classification" 4101, a field "particleName" 4102, a field 4103, a field "reference" 4104, a button "back track" 4105 and background picture.

Figure 42:
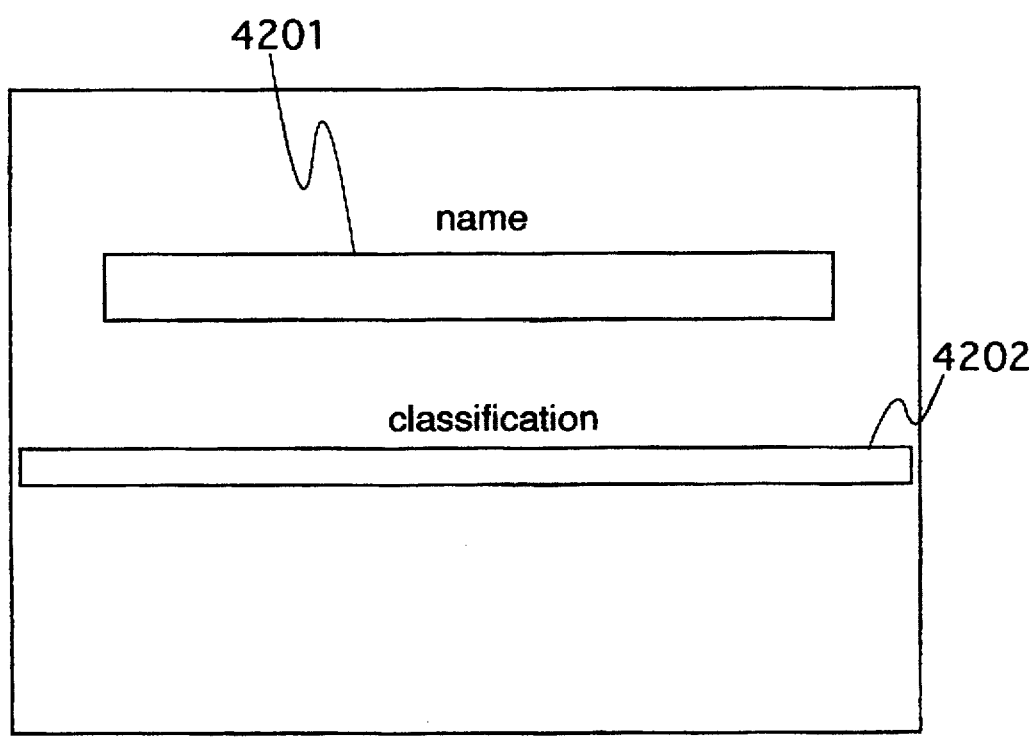
FIG. 42 is a chart of background "particlesBG".

FIG. 42 shows background "particlesBG", which comprises a field "particleName" 4201 and a field "classification" 4202.

Figure 43:
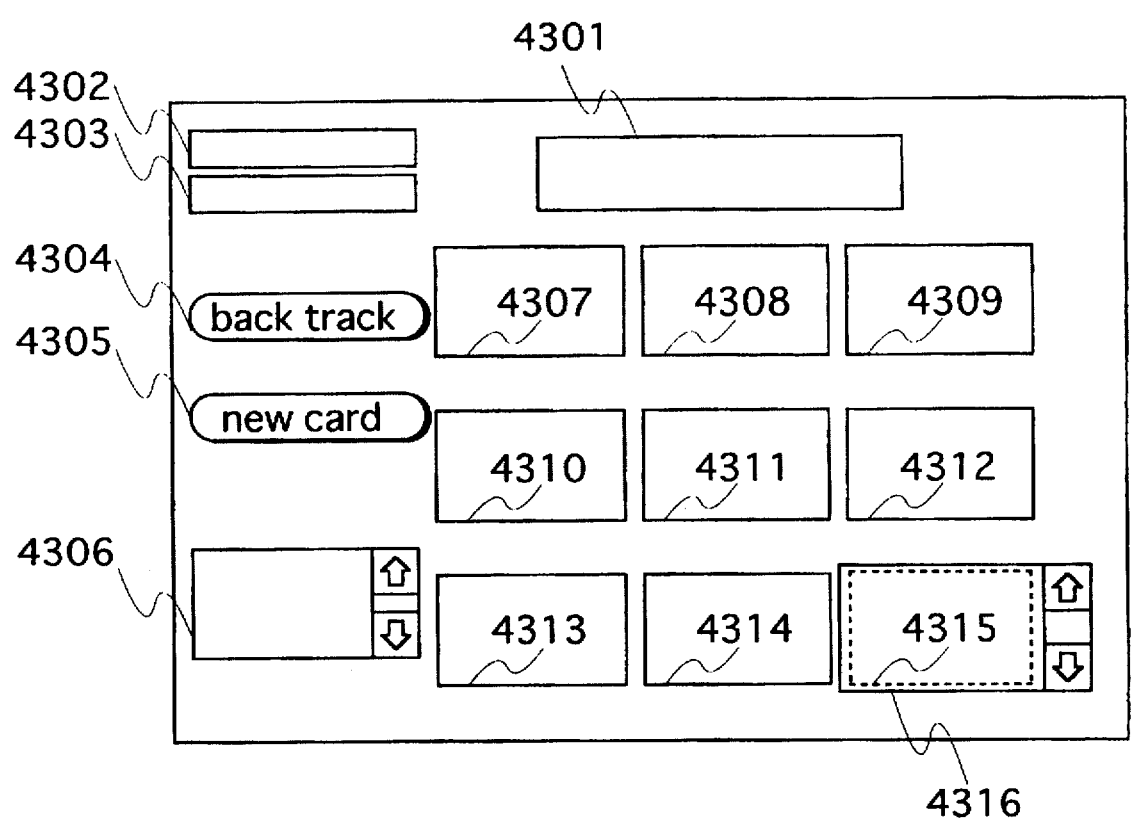
FIG. 43 is a chart of background "relationsBG".

FIG. 43 shows background "classificationsBG". This background comprises a field "makeupedName" 4301, a field "classificationName" 4302, a field "totalLinkNumber" 4303, a button "back track" 4304, a button "new card" 4305, a field "links" 4306, a field "button1" 4307, a field "button2" 4308, a field "button3" 4309, a field "button4" 43 10, a field "button5" 43 11, a field "button6" 4312, a field "button7" 4313, a field "button8" 4314, a field "otherButton" 4315 and a field "others" 4316 . The field "others" 4316 overlays the field "otherButton" 4315. The LockText properties of all fields on this background are true. Field 4306 and 4316 are scroll fields.

Figure 44:
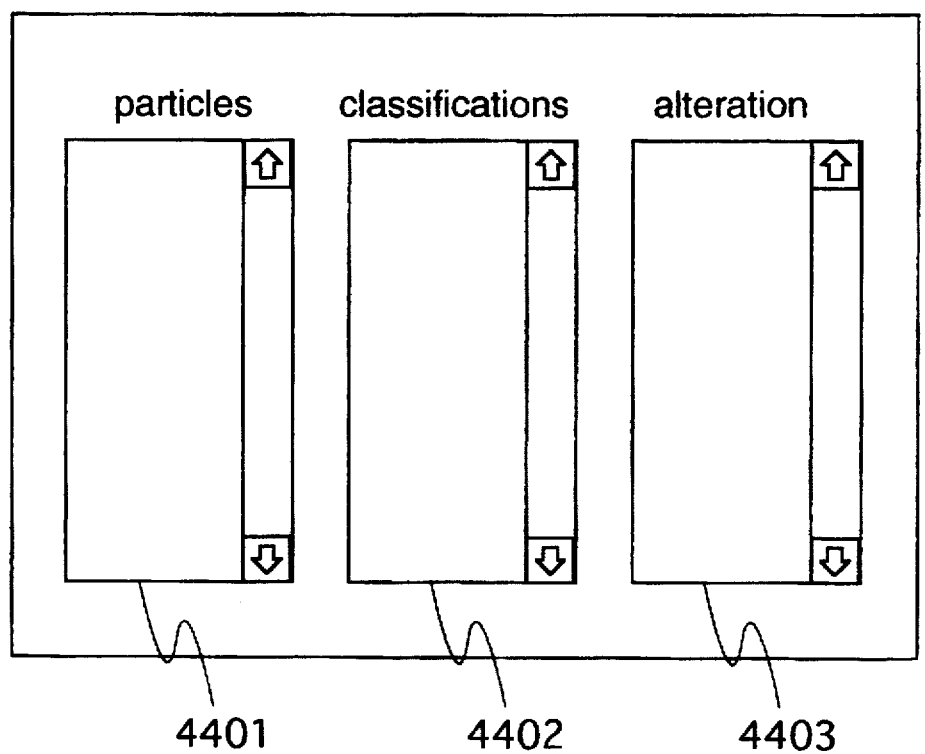
FIG. 44 is a chart of card "memorandum".

FIG. 44 shows the card "memorandum" of the unnamed background. Card "memorandum" comprises field "particles" 4401, field "classifications" 4402 and field "alteration" 4403.

The script of stack is as follows:

```
function textPos object, text
    global alterationM, particlesM, classificationsM, linkListM
    global locationAndLinkM, hierarchicalListM
    do "put text is not in" && object && "into TorF"
    if TorF then
        return ()
    else
        do "put number of lines of" && object && "into endLine"
        return textPosR(object, 1, endLine, text)
    end if
end textPos
function textPosR object,startLine,endLine,text
    global alterationM, particlesM, classificationsM, linkListM
    global locationAndLinkM, hierarchicalListM
    if startLine is endLine then
        --FOUND
        return startLine
    end if
    put trunc((startLine + endLine) / 2) into midLine
    do "put text is in line" && startLine && "to" && midLine && "of" && object && "into TorF"
    if TorF then
        return textPosR(object, startLine, midLine, text)
    else
        return textPosR(object, midLine + 1, endLine, text)
    end if
end textPosR
on openStack
    set textArrows to true
    global classificationsM, particlesM, mode
    put card field "classifications" of card "memorandum" into classificationsM
    put card field "particles" of card "memorandum" into particlesM
    go to card "-root-"
    put "Browse" into mode
end openStack
on closeStack
    global classificationsM, particlesM
    put classificationsM into card field "classifications" of card "memorandum"
    put particlesM into card field "particles" of card "memorandum"
end closeStack
```

The script contains:

a function "textPos" which calculates the position of a character string in a container;

a handler "closeStack" which stores the value of global variable "classificationsM" and "particlesM"; and a handler "openStack" which restores the value of both global variables:

"classificationsM", which memorizes all keywords; and

"particlesM", which memorizes all particle's name.

The script of card "memorandum" is as follows:

```
on openCard
    global classificationsM, particlesM, alterationM
    put classificationsM into card field "classifications"
    put particlesM into card field "particles"
    put alterationM into card field "alteration"
end openCard
```

When this card opened, the values of global variable "classificationsM", "particlesM" and "alterationM" are displayed. The global variable "alterationM" memorizes a alteration.

The script of background "personality" is as follows:

```
on closeCard
    global mode, alterationM, particlesM
    global classification, particleName
    if mode is "EnterParticle-2" then
        normalize
        put field "particleName" into particleName
        if particleName is not empty then
            if ">" & particleName & "<" is in particlesM then
                put getNewName(particleName) into particleName
                put particleName into field "particleName"
            end if
            set the lockText of field "particleName" to true
            set the name of this card to particleName
            put field "classification" into classification
            put "enterParticle-3" into mode
            go to background particlesBG
            put "browse" into mode
        else
            doMenu "Delete Card"
            popcard
        end if
    else if mode is "Browse-2" then
        normalize
        put "EnterParticle" into mode
        put field "particleName" into particleName
        put field "classification" into classification
        put "enterParticle-3" into mode
        go to background particlesBG
        put "browse" into mode
    endif
end closeCard
on normalize
    put line 1 of field "classification" into field "classification"
    put line 1 of field "particleName" into field "particleName"
    put Line 1 of field "reference" into field "reference"
end normalize
on openCard
    global mode
    if mode is "EnterParticle" then
        set lockText of field "particleName" to false
        put "EnterParticle-2" into mode
    else if mode is "Browse" then
        set lockText of field "particleName" to true
        put "Browse-2" into mode
    end if
end openCard
function getNewName cName
    global particlesM
    repeat
        ask quote & cName & quote & "has already exist. Please re-enter."
        with cName if it is not in particlesM then
            put it into cName
            exit repeat
        else
            put it into cName
        end if
    end repeat
    return cName
end getNewName
```

The handler "closeCard" passes a combination of a particle name and keywords to background "particlesBG". The handler "normalize" normalizes the card.

The script of button "back track" of background "personality" is as follows:

```
on mouseUp
    pop card
end mouseUp
```

The script of background "particlesBG" is as follows:

```
on openBackground
    global mode, particleName, classification, alterationM, particlesM
    if mode is "EnterParticle-3" then
        —NEW?
        if ">" & particleName & "<" is not in particlesM then
            put ">" & particleName & "<" & return after last char of
                particlesM
            put ">" & particleName & "<,_add" & return into
                alterationM
            doMenu "New Card"
            set name of this card to ">" & particleName & "<"
            put particleName into field "particleName"
        else
            put ">" & particleName & "<,—" & return into alterationM
        end if
        go to card ">" & particleName & "<"
        put number of items of classification into iMax
        repeat with i = 1 to iMax
            put "~" & (item i of classification) & "~" after last char of
                alterationM
            if field "classification" contains item i of classification then
                put ",_" & return after last char of alterationM
            else
                put ",_add" & return after last char of alterationM
            endif
        end repeat
        put number of items of field "classification" of this card into iMax
        repeat with i = 1 to iMax
            if item i of field "classification" is not in classification then
                put "~" & (item i of field "classification") & "~,_del" & return
                    after last char of alterationM
            end if
        end repeat
        if "_add" is in alterationM or "_del" is in alterationM then
            put classification into field "classification"
            put "AlterateHierarchy" into mode
            go to background "classificationsBG"
        end if
    end if
end openBackground
```

The handler "openBackground" accepts the combination of a particle name and keywords from background "personality", creates the alteration and passes the alteration to background "classificationsBG".

The script of background "classificationsBG" is as follows:

```
on openBackGround
    global mode, alterationM,classificationsM,classificationName
    if mode is "AlterateHierarchy" then
        put number of lines of alterationM into iMax
        repeat with i = 2 to iMax
            put line i of alterationm into it
            put first item of it into classificationName
            put second item of it into sortOfAlteration
            if sortOfAlteration is "_add" then
                if classificationName is not in classificationsM then
                    put classificationName & return after last char of classificationsM
```

```
        doMenu "New Card"
        set name of this card to classificationName
        put classificationName into field "classificationName"
        put 0 into field "totalLinkNumber"
      end if
    end if
  end repeat
  repeat with i = 2 to iMax
    put first item of line i of alterationM into nextCard
    go to card nextCard
    alterateLinkNumber
  end repeat
  repeat with i = 2 to iMax
    put first item of line i of alterationM into nextCard
    go to card nextCard
    discoverHierarchy
  end repeat
 end if
end openBackground
on alterateLinkNumber
 global mode,alterationM
 put field "classificationName" into myName
 put textPos("alterationM", myName) into myLine
 put second item of line myLine of alterationM into mySort
 put first item of line 1 of alteration into pName
 put second item of line 1 of alterationM into pSort
 if pSort is "__add" then
   send "addLinkNumberOfParticle" && quote & pName & quote to field "links" of this card
   put empty into mode
 else if pSort is "__del" then
   send "deleteLinkNumberOfParticle" && quote & pName & quote to field "links" of this card
   put empty into mode
 else if pSort is "__" then
   if mySort is "__add" then
     send "addLinkNumberOfParticle" && quote & pName & quote to field "links" of this card
     put empty into mode
   else if mySort is "__del" then
     send "deleteLinkNumberOfParticle" && quote & pName & quote to field "links" of this card
     put empty into mode
   end if
 else
   ask "internal error"
 end if
 put number of lines of alterationM into iMax
 repeat with i = 2 to iMax
   if myLine is not i then
     put line i of alterationM into it
     put first item of it into cName
     put second item of it into cSort
     if mySort is "__del" then
       if cSort is not "__add" then
         send "deleteLinkNumberOfClassification" && quote & cName & quote to field "links"
       end if
     else if mySort is "__add" then
       if cSort is not "__del" then
         send "addLinkNumberOfClassification" && quote & cName & quote to field "links"
       end if
     else
       if cSort is "__del" then
         send "deleteLinkNumberOfClassification" && quote & cName & quote to field "links"
       else if cSort is "__add" then
         send "addLinkNumberOfClassification" && quote & cName & quote to field "links"
       end if
     end if
   end if
 end repeat
end alterateLinkNumber
on discoverHierarchy
 global mode, alterationM
 put field "totalLinkNumber" into TLC
 put field "classificationName" into cName
 put number of lines of field "links" of this card into iMax
```

-continued

```
repeat with i = 1 to iMax
  put line i of field "links" of this card into iLink
  put first item of iLink into destination
  put third item of iLink into linkFlag
  if first char of iLink is ">" then
    put 0 into destTLC
  else
    put field "totalLinkNumber" 0f card destination into destTLC
  end if
  setLinkFlag i, cName, destination, destTLC, TLC
  if destination is not in alterationM then
    if linkFlag is "isHigher" then
      setLowerLinkOfHigher destination
    else if linkFlag is "isIncluded" or linkFlag is "isLower" then
      if (TLC > destTLC and 0.9 * TLC <= destTLC) or (destTLC > TLC and 0.9 * destTLC <= TLC) then
        put textPos("field" && quote & "links" & quote &&"of card" && quote & destination & quote, cName) into fLine
        put "isSame" into third item of line fLine of field "links" of card destination
      end if
    else if linkFlag is "isSame" then
      if 0.9 * TLC > destTLC then
        put textPos("field" && quote & "links" & quote &&"of card" && quote & destination & quote, cName) into fLine
        put "isHigher" into third item of line fLine of field "links" of card destination
      else if 0.9 * destTLC > TLC then
        if destination is not in alterationM then
          setLowerLinkOfHigher destination
        end if
      else
      end if
    end if
  end if
end repeat
if "isHigher" is not in field "links" and cName is not in field "links" of card "~root~"
then
  put cName & return after last char of field "links" of card "~root~"
end if
end discoverHierarchy
on setLowerLinkOfHigher linkName
  put field "totalLinkNumber" of card linkName into TLC
  put number of lines of field "links" of card linkName into iMax
  repeat with i = 1 to iMax
    put line i of field "links" of card linkName into iLink
    put first item of iLink into destination
    put third item of iLink into linkFlag
    if first char of iLink is ">" then
      put 0 into destTLC
    else
      put field "totalLinkNumber" of card destination into destTLC
    end if
    if linkFlag is "isLower" or linkFlag is "isIncluded" then
      setLinkFlag i, linkName, destination, destTLC, TLC
    end if
  end repeat
end setLowerLinkOfHigher
on setLinkFlag i, source, destination, destTLC, TLC
  if 0.9 * destTLC > TLC then
    put "isHigher" into third item of line i of field "links" of card source
  else if 0.9 * TLC > destTLC then
    if isIncludedLink(source, destination, TLC, destTLC) then
      put "isIncluded" into third item of line i of field "links" of card source
    else
      put "isLower" into third item of line i of field "links" of card source
    end if
  else
    put "isSame" into third item of line i of field "links" of card source
  end if
end setLinkFlag
function isIncludedLink cName, destination1, TLC, dest1TLC
  put number of lines of field "links" of card cName into iMax
  repeat with i = 1 to iMax
    put line i of field "links" of card cName into iLink
    put first item of iLink into destination2
    put third item of iLink into linkFlag
    - -calculate total link number of destination card
    if first char of iLink is ">" then
      - -destination2 links to a particle
      put 0 into dest2TLC
    else
```

-continued

```
  - -destination2 links to a relation
    put field "totalLinkNumber" of card destination2 into dest2TLC
  end if
  if destination1 is not destination2 and 0.9 * TLC > dest2TLC and 0.9 * dest2TLC >
dest1TLC then
    - -Does item i of link array of field "links" of card cName link to destination1?
    if destination1 is in field "links" of card destination2 then
    return true
    end if
  end if
end repeat
return false
end isIncludedlink
on makeUpCard
  global classificationsM
  lock screen
  put second word of the name of this card into wName
  put number of chars of wName into wk
  put char 3 to wk - 2 of wName into field "makeupedName"
  if "-root-" is in wName then
    put empty into lowerLink
    put empty into candidate
    put number of lines of field "links" into iMax
    repeat with i = 1 to iMax
      put item 1 of line i of field "links" into cName
      if cName is in classificationsM then
        if "isHigher" is not in field "links" of card cName then
          put field "totalLinkNumber" of card cName into TLC
          put itozi(TLC) &"," & cName & return after last char of candidate
          put cName & return after last char of lowerLink
        end if
      end if
    end repeat
    put lowerLink into field "links"
  else
    put empty into candidate
    put number of lines of field "links" into iMax
    repeat with i = 1 to iMax
      if third item of line i of field "links" is "isLower" then
        put item 1 of line i of field "links" into cName
        put item 2 of line i of field "links" into LC
        put itozi(LC) &"," & cName & return after last char of candidate
      end if
    end repeat
  end if
  sort candidate descending text
  put 8 into magicNumber
  put number of lines of candidate into cnum
  global nameLocOfButtonField
  put 3 into nameLocOfButtonField
  repeat with i = 1 to magicNumber
    put empty into field ("button" & i)
    if i <= cnum then
      put item 2 of line i of candidate into wk
      put number of chars of wk into nChar
      put char 2 to nChar - 1 of wk into fName
      put fName into line nameLocOfButtonField of field ("button" & i)
      if first char of wk is "~" then
        - -case relation
        put "(keyword)" into line nameLocOfButtonField + 1of field ("button" & i)
      end if
    end if
  end repeat
  hide field "others"
  put empty into field "others"
  put empty into field "otherButton"
  if cnum> magicNumber then
    repeat with i = magicNumber + i to cnum
      put item 2 of line i of candidate & return after last char of field "others"
    end repeat
    put "others. . ." into line nameLocOfButtonField of field "otherButton"
    set the style of field "otherButton" to rectangle
  else
    set the style of field "otherButton" to transparent
  end if
  choose browse tool
  unlock screen
end makeUpCard
on openCard
  global mode, classificationsM
```

```
if mode is "Browse" then
  if "_garbage_" is in the name of this card then
    doMenu "Delete Card"
    go to card "~root~"
  else
    makeUpCard
  end if
end if
end openCard
function itozi num
  put "00000" & num into wk
  put number of chars of wk into nChar
  return char nChar - 5 to nChar of wk
end itozi
```

In the following, relation A is a current relation and relation A has a link to relation B. The script comprises:

1. a handler "openBackground" which modifies link numbers and discovers the hierarchical structure of keywords;
2. a handler "alterateLinkNumber" which modifies link numbers;
3. a handler "discoverHierarchy" which discovers the hierarchical structure of keywords;
4. a handler "setLowerLinkOfHigher" which sets flags of relation B's "isLower" and "isIncluded" links;
5. a handler "setLinkFlag" which sets flags of a relation's link;
6. a function "isIncludedLink" which examines whether a link to relation B is an "isIncluded" link; p1 7. a handler "makeupCard" which makes-up cards of this background.

The name of first card of background "classificationsBG" is "~root~".

The script of field "links" of background "classificationsBG" is as follows:

```
on addLinkNumberOfClassification cName
  put textPos("field" && quote & "links" & quote, cName) into tLine
  if tLine is 0 then
    put cName & ",1,null" & return after last char of me
  else
    put second item of line tLine of me into linkNumber
    add 1 to second item of line tLine of me
  end if
  add 1 to field "totalLinkNumber" of this card
end addLinkNumberOfClassification
on deleteLinkNumberOfClassification cName
  put textPos("field" && quote & "links" & quote, cName) into tLine
  if tLine is 0 then
    ask "internal error"
    put empty into dummy
  end if
  put second item of line tLine of me into linkNumber
  if linkNumber is 1 then
    delete line tLine of me
  else
    subtract 1 from the second item of line tLine of me
  end if
  subtract 1 from field "totalLinkNumber" of this card
  if field "totalLinkNumber" of this card is 0 then
    changeThisCardToGarbage
  end if
end deleteLinkNumberOfClassification
on changeThisCardToGarbage
  global classificationsM
  choose brush tool
  drag from 20,20 to 490,360
  drag from 490,20 to 20,360
  choose browse tool
  put textPos("classificationsM", field "classificationName") into tLine
  delete line tLine of classificationsM
  set the name of this card to "_garbage_"
end changeThisCardToGarbage
on addLinkNumberOfParticle pName
  put textPos("field" && quote & "links" & quote, pName) into tLine
  if tLine is 0 then
    put pName & ",1,null" & return after last char of me
    add 1 to field "totalLinkNumber" of this card
  else
    ask "internal error"
    put empty into dummy
  end if
end addLinkNumberOfParticle
on deleteLinkNumberOfParticle pName
  put textPos("field" && quote & "links" & quote, pName) into tLine
  if tLine is 0 then
    ask "internal error"
  end if
  delete line tLine of me
  subtract 1 from field "totalLinkNumber" of this card
  if field "totalLinkNumber" of this card is 0 then
    changeThisCardToGarbage
  end if
end deleteLinkNumberOfParticle
```

The script comprises handlers which increment or decrement link numbers.

The script of field "others" of background "classificationsBG" is as follows:

```
on mouseUp
  push card
  put the clickLine into object
  do "put" && object && "into wk"
  put number of chars of wk into nChar
  if first char of wk is "~" then
    put wk into cName
  else
    put char 2 to nChar - 1 of wk into cName
  end if
  hide me
  go to card cName
end mouseUp
```

The script of field "otherButton" of background "classificationsBG" is as follows:

```
on mouseUp
  if the style of me is rectangle then
    show field "others"
  end if
end mouseUp
```

The script displays field "others".

The script of field from "button1" to "button8" is as follows:

```
on mouseUp
    push card
    put empty into cName
    put number of lines of me into iMax
    repeat with i = 1 to iMax
        if line i of me is not empty then
            put line i of me into cName
            exit repeat
        end if
    end repeat
    if cName is not empty then
        if "(keyword)" is not in me then
            go to card cName
        else
            go to card "~" & cName & "~"
        end if
    end if
end mouseUp
```

The script of button "backtrack" of background "classificationsBG" is as follows:

```
on mouseUp
    pop card
end mouseUp
```

The script of field "new card" of background "classificationsBG" is as follows:

```
on mouseUp
    global mode
    push card
    put empty into mode
    go to background "personality"
    put "EnterParticle" into mode
    doMenu "New Card"
end mouseUp
```

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

Also it is to be understood that the phraseology or terminology employed herein is for the purpose of description and not of limitation.

What is claimed is:

1. An apparatus for classifying information comprising:
   (a) means for generating a relation having the following elements each a keyword,
       (i) a keyword identifier,
       (ii) a total link number,
       (iii) links to information or other relations,
   (b) means for discovering a hierarchy structure of a total information and a total keyword by comparing the total link numbers of two relations with links with each other thereby making a high level relation a larger total link number,
   (c) means for memorizing said relations, and
   (d) means for memorizing said information.

2. An apparatus according to claim 1 wherein said means
   (b) for discovering a hierarchy structure discovers said total information and said total keyword by:
       (i) comparing the total link numbers of two relations with links with each other, thereby making a high level relation having a larger total link number, and
       (ii) making ineffective the link to said high level relation, said link being included in all of relations.

3. An apparatus according to claim 1, wherein said means
   (b) for discovering a hierarchy structure discovers said total information and said total keyword by:
       (i) comparing the total link numbers of two relations with links with each other, thereby making a high level relation having a larger total link number;
       (ii) making ineffective the link to said high level relation, said link being included in all of relations;
       (iii) making ineffective the p-th link $L_{ip}$ included in a relation $R_i$ under the following conditions;
           said link $L_{ip}$ being linked to a low level relation $R_j$ lower than said relation $R_i$,
           the q-th link $L_{iq}$ included in said relation $R_i$ being linked to the relation $R_k$ lower than said relation $R_i$ and higher than said relation $R_j$, and
           said relation $R_k$ having the link to be linked to said relation $R_j$;
       (iv) making ineffective the p-th link $L_{ip}$ included in said relation $R_i$ under following conditions;
           said link $L_{ip}$ being linked to an information $I_m$,
           the q-th link $L_{iq}$ included in said relation $R_i$ being linked to the relation $R_k$ lower than said relation $R_i$,
           said relation $R_k$ having the link to said information $I_m$.

* * * * *